(12) United States Patent
Stearns et al.

(10) Patent No.: US 11,353,221 B2
(45) Date of Patent: Jun. 7, 2022

(54) PIVOTING HANDLE FOR DEHUMIDIFIER

(71) Applicant: Therma-Stor LLC, Madison, WI (US)

(72) Inventors: Jared M. Stearns, Madison, WI (US); Steven S. Dingle, McFarland, WI (US); Todd R. DeMonte, Cottage Grove, WI (US)

(73) Assignee: THERMA-STOR LLC, Madison, WI (US)

( * ) Notice: Subject to any disclaimer, the term of this patent is extended or adjusted under 35 U.S.C. 154(b) by 807 days.

(21) Appl. No.: 16/255,270

(22) Filed: Jan. 23, 2019

(65) Prior Publication Data

US 2019/0234625 A1 Aug. 1, 2019

Related U.S. Application Data

(60) Provisional application No. 62/622,656, filed on Jan. 26, 2018.

(51) Int. Cl.
| | |
|---|---|
| *F16M 1/00* | (2006.01) |
| *F24F 3/14* | (2006.01) |
| *F25B 6/02* | (2006.01) |
| *F25B 5/02* | (2006.01) |
| *F24F 11/30* | (2018.01) |
| *F24F 1/0358* | (2019.01) |
| *F16M 3/00* | (2006.01) |
| *F24F 1/04* | (2011.01) |

(Continued)

(52) U.S. Cl.
CPC ............. *F24F 3/1405* (2013.01); *F16M 1/00* (2013.01); *F16M 3/00* (2013.01); *F24F 1/0358* (2019.02); *F24F 1/04* (2013.01); *F24F 3/14* (2013.01); *F24F 11/30* (2018.01); *F24F 13/20* (2013.01); *F25B 5/02* (2013.01); *F25B 6/02* (2013.01); *F24F 2110/10* (2018.01); *F24F 2110/20* (2018.01); *F24F 2221/125* (2013.01)

(58) Field of Classification Search
CPC .... F24F 2221/125; F24F 3/1404; F24F 11/30; F24F 1/0358; F24F 3/14; F24F 1/04; F24F 13/20; F16M 1/00; F16M 3/00; F25B 5/02; F25B 6/02
See application file for complete search history.

(56) References Cited

U.S. PATENT DOCUMENTS

| | | | |
|---|---|---|---|
| 4,321,800 A * | 3/1982 | Gifford, Jr. ............ | F24F 13/22 137/403 |
| 10,928,081 B2 * | 2/2021 | Cho ...................... | F24F 13/222 |

(Continued)

*Primary Examiner* — Amy J. Sterling
(74) *Attorney, Agent, or Firm* — Baker Botts, LLP

(57) ABSTRACT

A portable dehumidifier includes a cabinet and a pivoting handle. The pivoting handle is configured to pivot from a stored position to an engaged position. The pivoting handle includes a cross member, two extension members, and a cam arm. The cam arm is coupled to one of the extension members at an end of the extension member that is opposite the cross member. The cam arm includes a spring arm configured to engage with a locking pin coupled to the cabinet, a clearance hole configured to permit the cam arm to clear the locking pin when the pivoting handle is in the stored position, an aperture configured to permit a pivot pin to secure the cam arm to the cabinet, and a compression gap adjacent to the spring arm. The compression gap is configured to permit the spring arm to provide resistance to the pivoting handle during pivoting.

20 Claims, 21 Drawing Sheets

(51) Int. Cl.
    *F24F 13/20*     (2006.01)
    *F24F 110/20*    (2018.01)
    *F24F 110/10*    (2018.01)

(56) References Cited

U.S. PATENT DOCUMENTS

| | | | |
|---|---|---|---|
| 11,073,294 B2 * | 7/2021 | Stearns | F24F 13/20 |
| 2011/0247352 A1 * | 10/2011 | Zanolin | F24F 3/14 |
| | | | 62/263 |
| 2012/0137641 A1 * | 6/2012 | Thrush | F24F 13/20 |
| | | | 55/423 |
| 2016/0273789 A1 * | 9/2016 | Gwen | F24F 3/1411 |
| 2018/0372371 A1 * | 12/2018 | DeMonte | F24F 13/32 |
| 2019/0175412 A1 * | 6/2019 | Benton | A61F 9/068 |
| 2021/0396403 A1 * | 12/2021 | Chiu | F24F 3/1405 |

* cited by examiner

PIVOTING HANDLE FOR DEHUMIDIFIER

PRIORITY

This application claims the benefit, under 35 U.S.C. § 119(e), of U.S. Provisional Patent Application No. 62/622,656, filed 26 Jan. 2018, which is incorporated herein by reference in its entirety.

This invention relates generally to dehumidification and more particularly to a pivoting handle for a dehumidifier.

BACKGROUND OF THE INVENTION

In certain situations, it is desirable to reduce the humidity of air within a structure. For example, in fire and flood restoration applications, it may be desirable to quickly remove moisture from areas of a damaged structure. To accomplish this, one or more portable dehumidifiers may be placed within the structure to dehumidify the air and direct dry air toward water-damaged areas. Many current dehumidifiers, however, are bulky, difficult to move, not rugged, and have proven inefficient in various respects.

SUMMARY OF THE INVENTION

According to embodiments of the present disclosure, disadvantages and problems associated with previous dehumidification systems may be reduced or eliminated.

In some embodiments, a portable dehumidifier includes a cabinet, a fan, a dehumidification system, and a compressor. The cabinet includes a front side and a back side opposite the front side, an airflow inlet located on a first side of the cabinet, and an airflow outlet located on a second side of the cabinet that is opposite the first side. The dehumidification system includes a secondary evaporator located proximate to the airflow inlet, a primary condenser located proximate to the airflow outlet, a primary evaporator located adjacent to the secondary evaporator, a secondary condenser located between the primary evaporator and the primary condenser, and a compressor. The fan is configured to generate an airflow that flows into the cabinet through the airflow inlet and out of the cabinet through the airflow outlet. The airflow flows through the dehumidification system in order to provide dehumidification to the airflow.

In some embodiments, a portable dehumidifier includes a cabinet and a pivoting handle. The cabinet includes a front side and a back side opposite the front side. The pivoting handle is configured to pivot from a stored position to an engaged position. The pivoting handle includes a cross member, two extension members, and a cam arm. The cross member is configured to permit a user to grip the pivoting handle. Each extension member is coupled to a respective end of the cross member. The cam arm is coupled to one of the extension members at an end of the extension member that is opposite to cross member. The cam arm includes a spring arm configured to engage with a locking pin coupled to the cabinet, a clearance hole configured to permit the cam arm to clear the locking pin when the pivoting handle is in the stored position, an aperture configured to permit a pivot pin to secure the cam arm to the cabinet, and a compression gap adjacent to the spring arm. The compression gap is configured to permit the spring arm to provide resistance to the pivoting handle during pivoting.

In certain embodiments, a portable dehumidifier includes a cabinet and two wheel mounting brackets. The cabinet includes a front side and a back side opposite the front side, and a top side and a bottom side opposite the top side. Each wheel mounting bracket is configured to secure one of two wheels to the cabinet. Each wheel mounting bracket includes an inside member, a bottom member, a top member and an outside member. The inside member includes a first axle aperture that is configured to accept one end of an axle used to secure one of the two wheels to the cabinet. The bottom member is coupled to the inside member and is proximate to the bottom side of the cabinet. The bottom member includes one or more mounting apertures configured to permit one of more fasteners to couple the wheel mounting bracket assembly to the bottom side of the cabinet. The outside member is proximate to an outside of the cabinet with respect to the inside member and includes a second axle aperture configured to accept another end of the axle. The top member couples the outside member to the inside member and is coupled to an end of the inside member opposite to be bottom member. The top member includes one or more locating pins configured to be inserted into one or more locating apertures in the cabinet.

In certain embodiments, a method for controlling a fan of a dehumidifier includes performing a first step of obtaining an ambient temperature, an exhaust temperature, and a delta temperature that is a difference between the ambient temperature and the exhaust temperature. The method further include determining, after performing the first step, whether the delta temperature is within a delta temperature range. If the delta temperature is within the delta temperature range, the method proceeds back to the first step. If the delta temperature is not within the delta temperature range, the method performs, a second step of determining an adjusted fan speed using the delta temperature. The method further includes performing, after performing the second step, a third step of setting the fan speed to the determined adjusted fan speed.

Certain embodiments of the present disclosure may provide one or more technical advantages. For example, unique internal arrangement of components of certain embodiments provides a portable dehumidifier that is more compact and rugged than existing systems. Certain embodiments include a pivoting/folding handle that pivots to an angle when the portable dehumidifier is being transported but folds down against the portable dehumidifier for storage. In some embodiments, the portable dehumidifier utilizes two unique wheel mounting brackets that enable the wheels to be mounted partially within and very close to the cabinet of the portable dehumidifier, thereby increasing the compactness of the portable dehumidifier. In some embodiments, the portable dehumidifier utilizes a unique control method for its fan that utilizes a delta temperature that is calculated between the exhaust and ambient temperatures. In these embodiments, there is a minimum delta temperature for each ambient temperature that the portable dehumidifier will attempt to maintain by adjusting its fan speed. If the delta temperature falls below a minimum allowed amount, the fan will be slowed to maintain the desired delta temperature.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 9A-98 illustrate another embodiment of the wheel mounting bracket assembly of FIGS. 8A-8D, according to certain embodiments;

DETAILED DESCRIPTION OF THE DRAWINGS

In certain situations, it is desirable to reduce the humidity of air within a structure. For example, in fire and flood restoration applications, it may be desirable to remove water and moisture from a damaged structure by placing one or more portable dehumidifiers within the structure. Many current dehumidifiers, however, are bulky, difficult to move, not rugged, and have proven inefficient in various respects.

The disclosed embodiments provide a portable dehumidifier that includes various features to address the inefficiencies and other issues with current portable dehumidification systems. In some embodiments, a unique internal arrangement of components is used to provide a portable dehumidifier that is more compact and rugged than existing systems. Certain embodiments include a pivoting/folding handle that pivots to an angle when the portable dehumidifier is being transported but folds down against the portable dehumidifier for storage. In some embodiments, the portable dehumidifier utilizes two unique wheel mounting brackets that enable the wheels to be mounted partially within and very close to the cabinet of the portable dehumidifier, thereby increasing the compactness of the portable dehumidifier. In some embodiments, the portable dehumidifier utilizes a unique control method for its fan that utilizes a delta temperature that is calculated between the exhaust and ambient temperatures. In these embodiments, there is a minimum delta temperature for each ambient temperature that the portable dehumidifier will attempt to maintain by adjusting its fan speed. If the delta temperature falls below a minimum allowed amount, the fan will be slowed to maintain the desired delta temperature.

Figure 1:
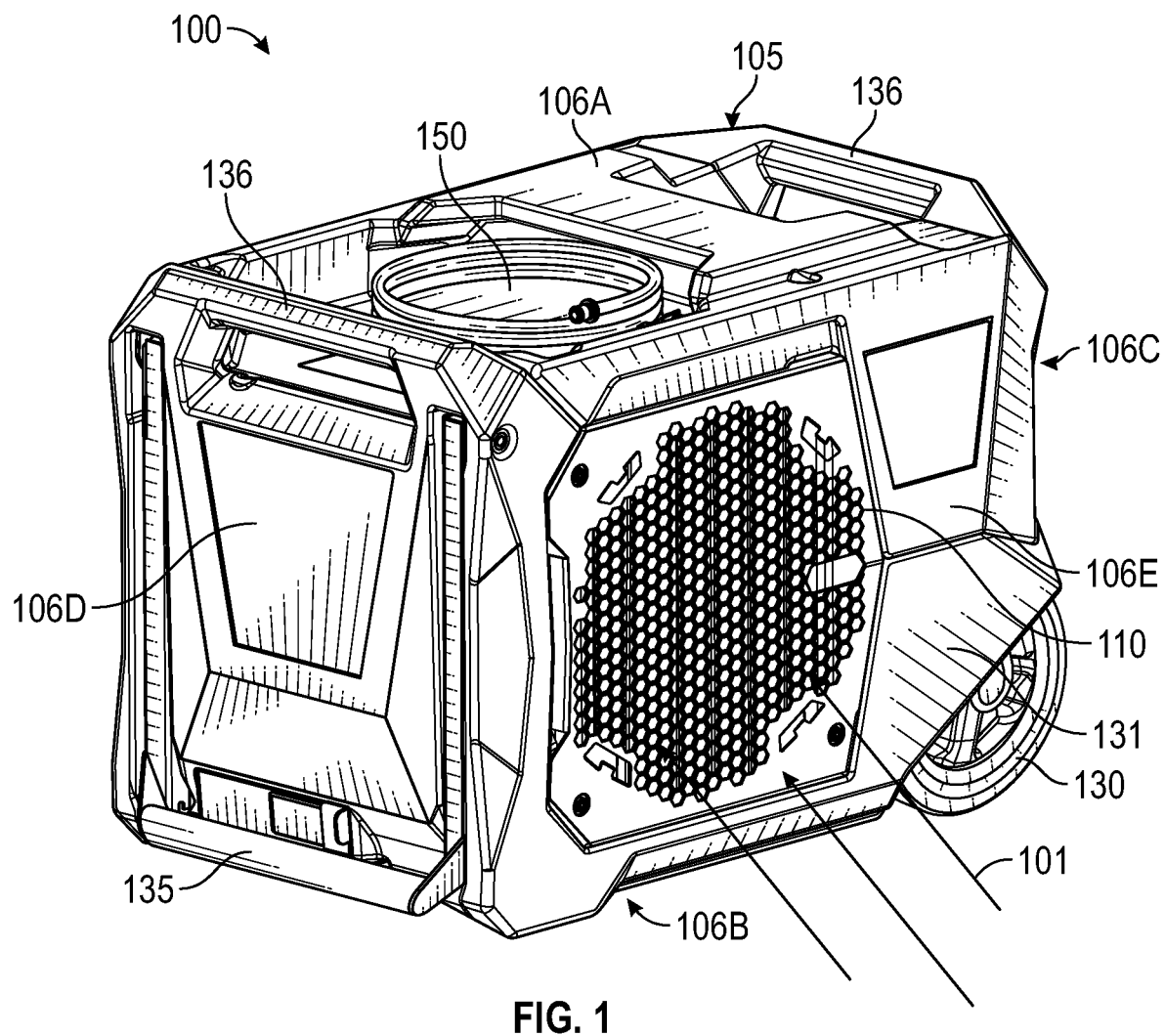
FIGS. 1-2 illustrate perspective views of a portable dehumidifier, according to certain embodiments.
Figure 2:
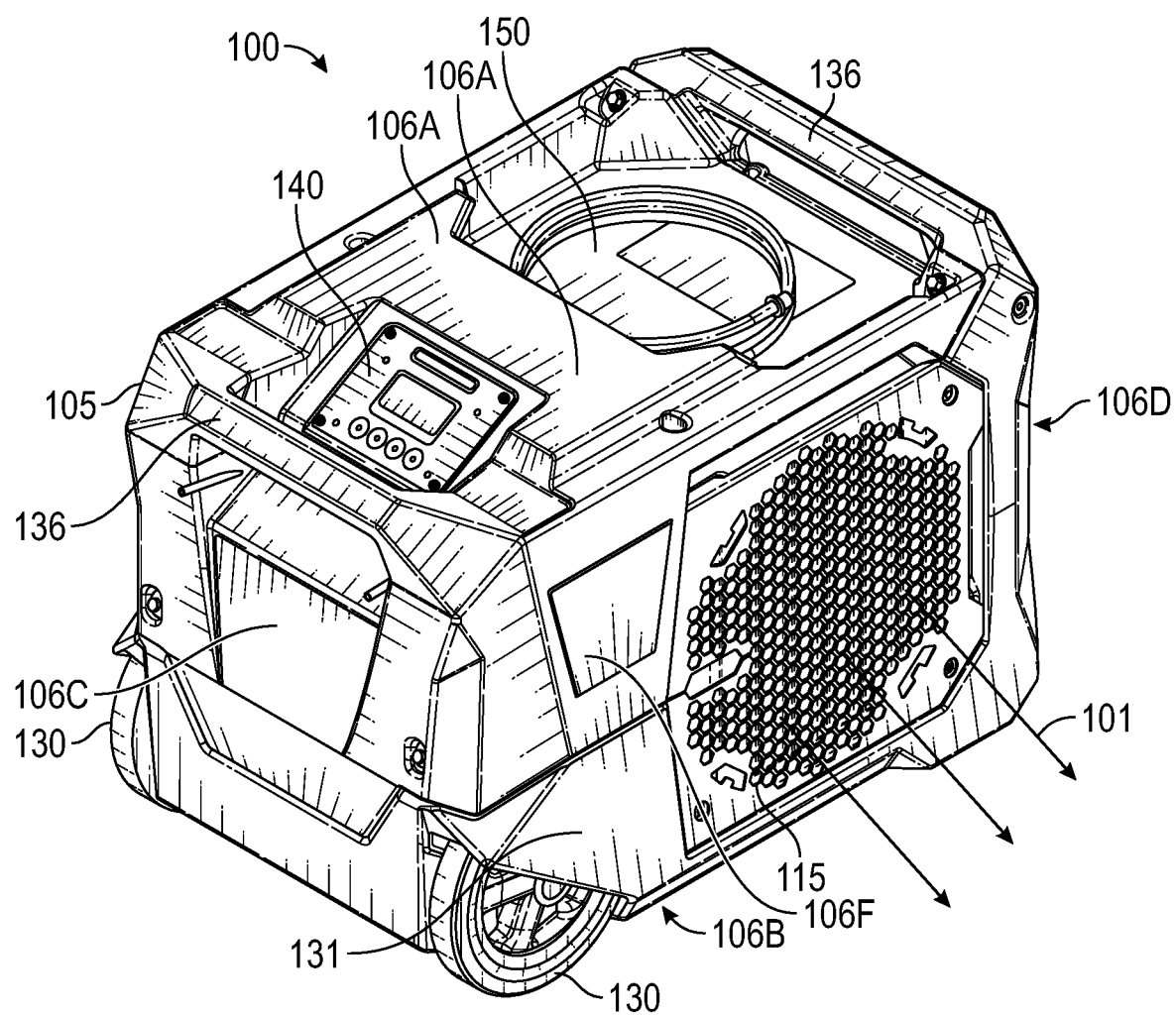

These and other advantages and features of certain embodiments are discussed in more detail below in reference to FIGS. 1-11. FIGS. 1-2 illustrate perspective views of certain embodiments of a portable dehumidifier; FIGS. 3A-3F illustrate cut-away views of the portable dehumidifier of FIGS. 1-2, FIGS. 4-6 illustrate various positions of a pivoting handle of the portable dehumidifier of FIGS. 1-2, FIGS. 7A-7G illustrate more details of the pivoting handle of FIGS. 4-6, FIGS. 8A-8D illustrate a wheel mounting bracket of the portable dehumidifier of FIGS. 1-2, FIGS. 9A-9B illustrate another embodiment of the wheel mounting bracket of FIGS. 8A-8D, FIG. 10 illustrates a fan control method that may be used by the portable dehumidifier of FIGS. 1-2, and FIG. 11 illustrates a computing system that may be used by the portable dehumidifier of FIGS. 1-2, according to certain embodiments.

FIGS. 1-2 illustrate perspective views of a portable dehumidifier 100, according to certain embodiments. In some embodiments, portable dehumidifier 100 includes a cabinet 105, an airflow inlet 110, an airflow outlet 115, two or more wheels 130, a pivoting handle 135, and one or more stationary handles 136. While a specific arrangement of these and other components of portable dehumidifier 100 are illustrated in these figures, other embodiments may have other arrangements and may have more or fewer components than those illustrated.

In general, portable dehumidifier 100 provides dehumidification to an area (e.g., a room, a floor, etc.) by moving air through portable dehumidifier 100. To dehumidify air, portable dehumidifier 100 generates an airflow 101 that enters cabinet 105 via airflow inlet 110, travels through a dehumidification system (e.g., dehumidification system 300 described below) where it is dried, and then exits cabinet 105 via airflow outlet 115. Water removed from airflow 101 via the dehumidification system may be captured within a water reservoir of portable dehumidifier 100 (e.g., drain pan 360 described below) where it may be later removed via, for example, a drain or a pump (e.g., drain pump 370 described below).

Cabinet 105 may be any appropriate shape and size. In some embodiments, cabinet 105 includes multiple sides 106. For example, some embodiments of cabinet 105 include a top side 106A, a bottom side 106B, a front side 106C, a back side 106D, a right side 106E, and a left side 106F as illustrated in the figures. In some embodiments, airflow inlet 110 is on right side 106E and airflow outlet 115 is on left side 106F.

In some embodiments, cabinet 105 is formed from a rugged material such as plastic. In some embodiments, cabinet 105 is formed using a plastic rotational, molding process. In some embodiments, all or a portion of cabinet 105 is removable for maintenance and service to portable dehumidifier 100. For example, cabinet 105 may include separate top and lower portions that are coupled to each other using any appropriate fasteners (e.g., screws, bolts, etc.). The top portion of cabinet 105 may be easily removed by removing a certain number of fasteners that are accessible from the outside of cabinet 105.

Airflow inlet 110 is generally any opening in which airflow 101 enters portable dehumidifier 100. In some embodiments, airflow inlet 110 is geometric (e.g., hexagonal, octagonal, square, rectangular, etc.) in shape as illustrated. In other embodiments, airflow inlet 110 may have any other appropriate shape or dimensions. In some embodiments, airflow inlet 110 includes a grate or grille that is formed out of geometric shapes. For example, some embodiments of airflow inlet 110 include a grill formed from hexagons, octagons, and the like. In some embodiments, a removable air filter (e.g., air filter 310 described below) may be installed proximate to airflow inlet 110 to filter airflow 101 as it enters portable dehumidifier 100. In some embodiments, airflow inlet 110 is located on right side 106E as illustrated in the figures, but may be in any other appropriate location on other embodiments of portable dehumidifier 100.

Airflow outlet 115 is generally any opening in which airflow 101 exits portable dehumidifier 100 after it has passed through a dehumidification system of portable dehumidifier 100 such as dehumidification system 1400 for dehumidification. Similar to airflow inlet 110, airflow outlet 115 includes a grate or grille that is formed out of geometric shapes such as hexagons, octagons, and the like. Airflow outlet 115 may be hexagonal, octagonal, square, or rectangular in shape, but may have any other appropriate shape or dimensions. In some embodiments, airflow outlet 115 is located on left side 106F as illustrated in the figures, but may be in any other appropriate location on other embodiments of portable dehumidifier 100.

Figure 3A:
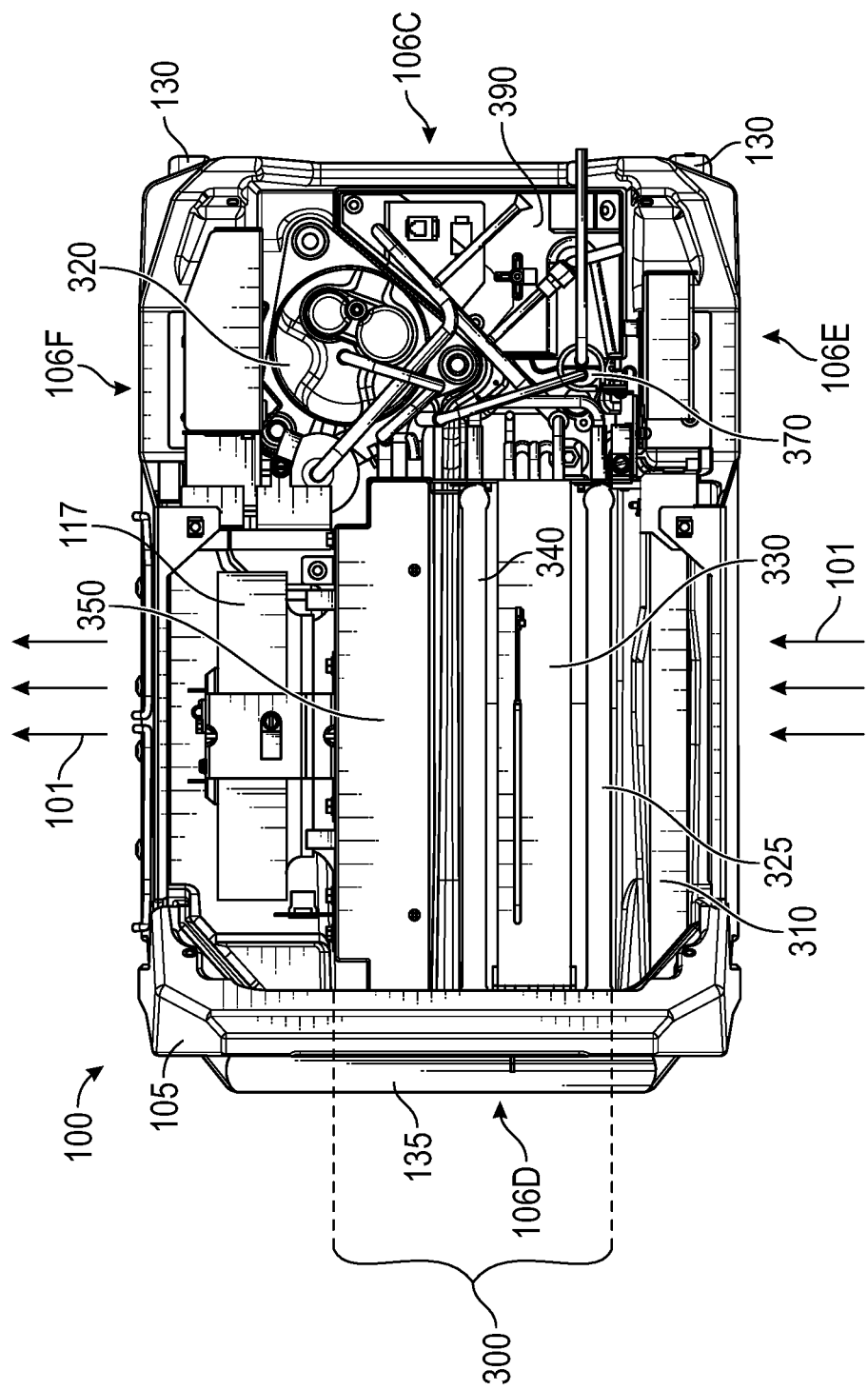
FIGS. 3A-3F illustrate cut-away views of the portable dehumidifier of FIGS. 1-2, according to certain embodiments.
Figure 3B:
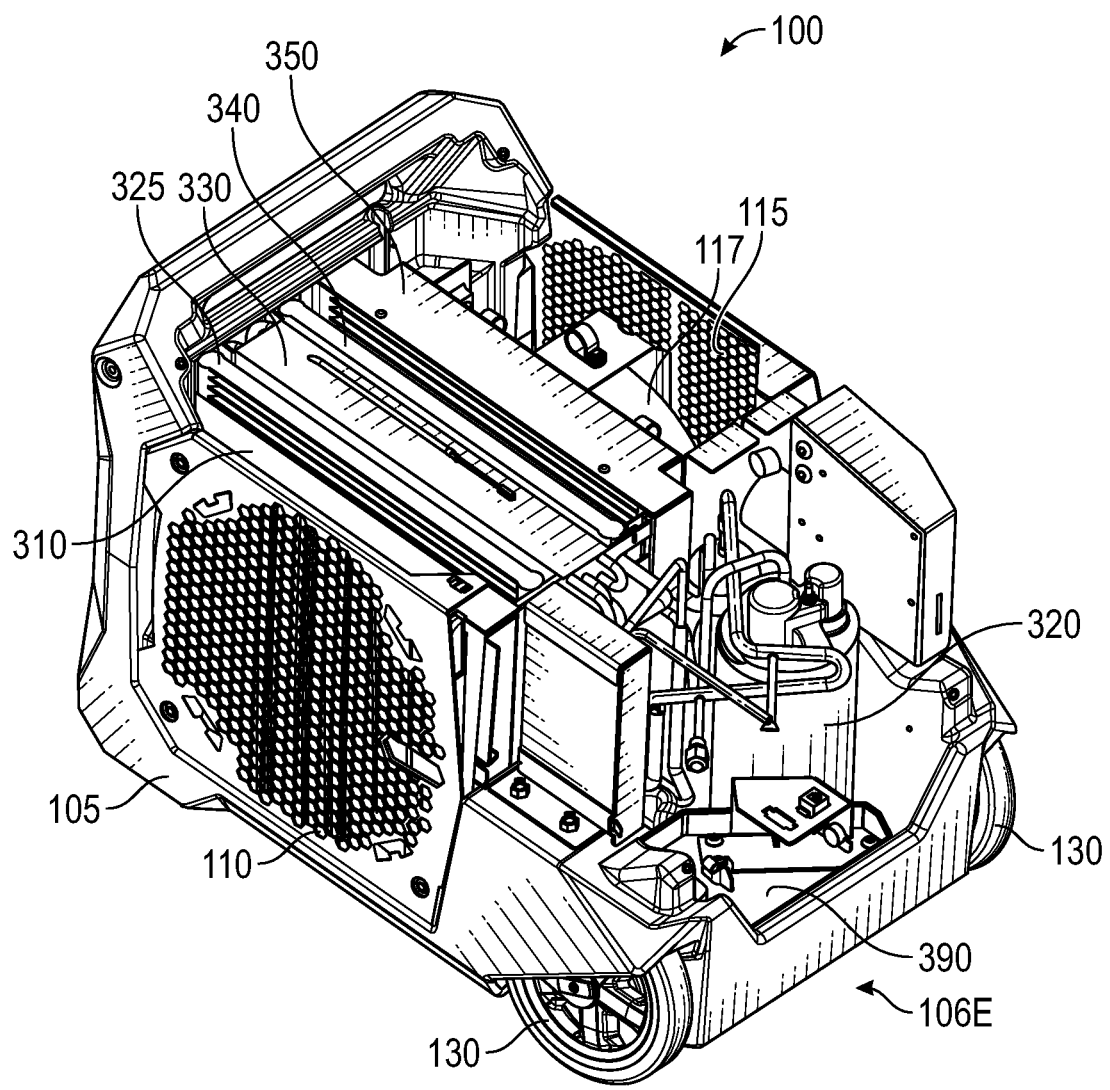
Figure 3C:
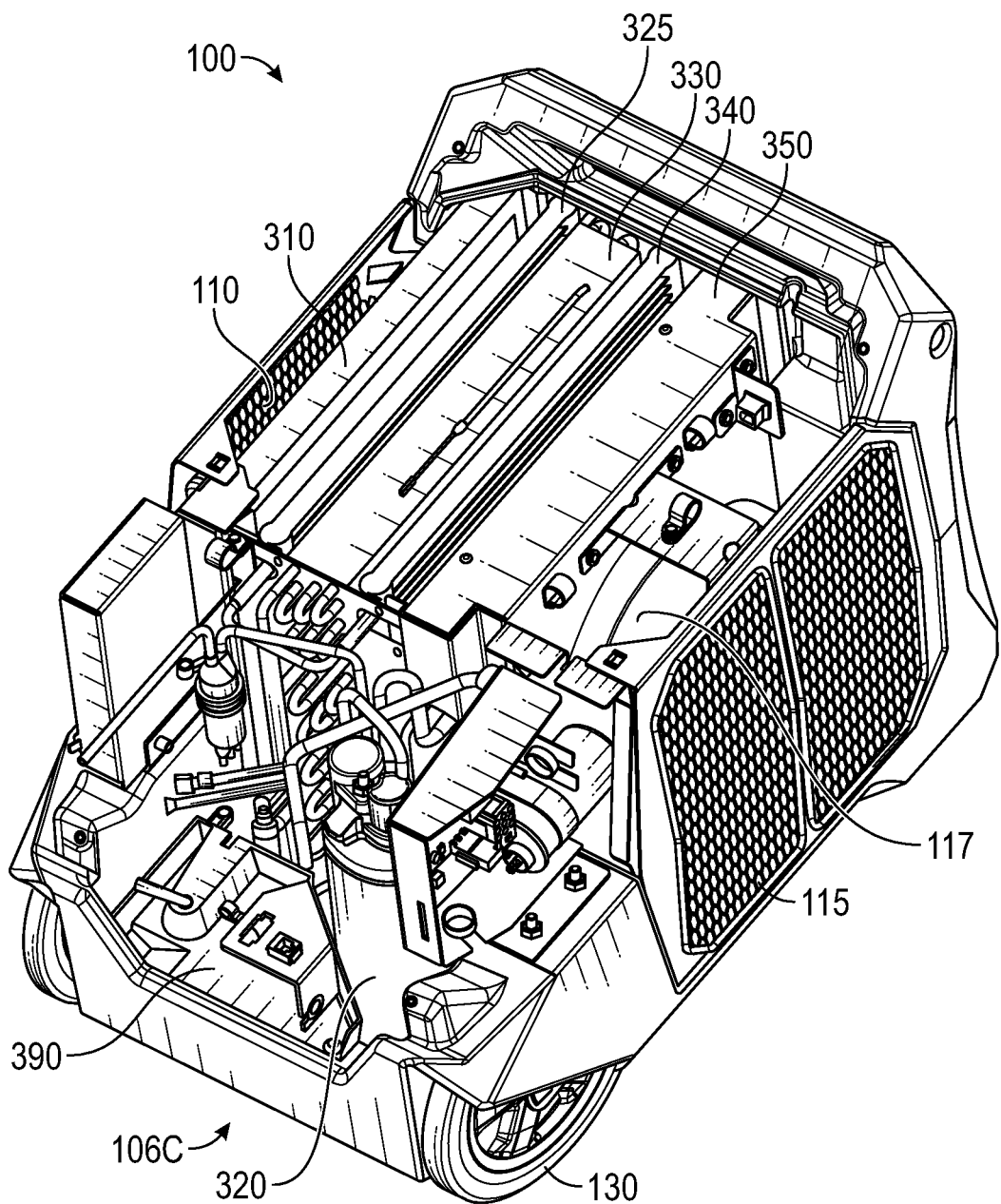

Portable dehumidifier 100 includes a fan 117 that, when activated, draws airflow 101 into portable dehumidifier 100 via airflow inlet 110, causes airflow 101 to flow through a dehumidification system such as dehumidification system 300, and exhausts airflow 101 out of airflow outlet 115. In some embodiments, fan 117 is located within cabinet 105 proximate to airflow outlet 115 as illustrated in FIGS. 3A-3C. Fan 117 may be any type of air mover (e.g., axial fan, forward inclined impeller, backward inclined impeller, etc.) that is configured to generate airflow 101 that flows through portable dehumidifier 100 for dehumidification and exits portable dehumidifier 100 through airflow outlet 115.

Embodiments of portable dehumidifier 100 may include two or more wheels 130. In some embodiments, portable dehumidifier 100 includes two wheels 130 as illustrated that permit portable dehumidifier 106 to be tilted towards front side 106C and easily transported to a new location. Wheels 130 may be of any size and be made of any appropriate materials. In some embodiments, wheels 130 may be mounted to cabinet 105 using a bracket such as wheel mounting bracket assembly 810 or wheel mounting bracket 910 described below in reference to FIGS. 8A-9B. The use of such brackets may allow wheels 130 to be partially within and close to cabinet 105, which may help decrease the size and footprint of portable dehumidifier 100.

Some embodiments of portable dehumidifier 100 may include a pivoting handle 135. Pivoting handle 135 may be used is tilt portable dehumidifier 100 towards front side 106C and rolled to a new location. Particular embodiments of pivoting handle 135 are described below in reference to FIGS. 7A-7G.

In some embodiments, portable dehumidifier 100 includes one or more stationary handles 136 that permit operators to lift and move portable dehumidifier 100. In some embodiments, stationary handles 136 are formed as a part of cabinet 105, but may be separate attachments in other embodiments. In some embodiments, portable dehumidifier 100 includes a first stationary handle 136 located on front side 106C and a second stationary handle 136 located on back side 106D of cabinet 105.

Embodiments of portable dehumidifier 100 also include a control panel 140 located in cabinet 105. In general, control panel 140 provides various controls for an operator to control certain functions of portable dehumidifier 100. While control panel 140 is located on top side 106A close to front side 106C in some embodiments, control panel 140 may be located in any appropriate location on cabinet 105.

In some embodiments, portable dehumidifier 100 includes a storage compartment 150 within cabinet 105. In general, storage compartment 130 provides a convenient location for operators to store hoses, cords, and other items needed for the operation of portable dehumidifier 100. In some embodiments, storage compartment 150 is an open pocket located on top side 106A of cabinet 105 as illustrated. In other embodiments, storage compartment 150 may be in any other appropriate location on cabinet 105 and may include one or more doors or panels to enclose storage compartment 150. Storage compartment 150 allows the operator to store needed accessories (e.g., cords, hoses, etc.) for each job without limiting the ability to stack and store portable dehumidifier 100 in the smallest possible volume during transport.

Figure 3D:
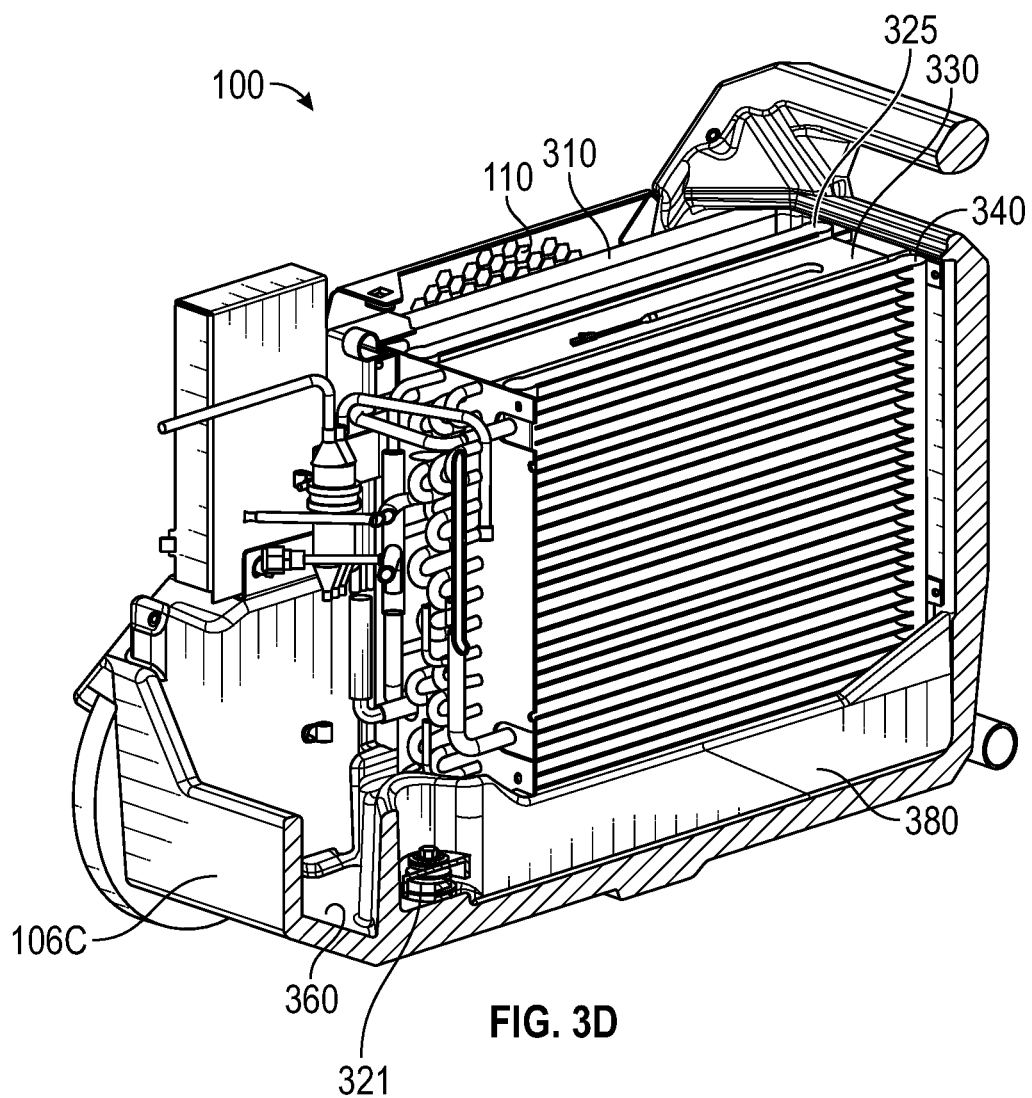
Figure 3E:
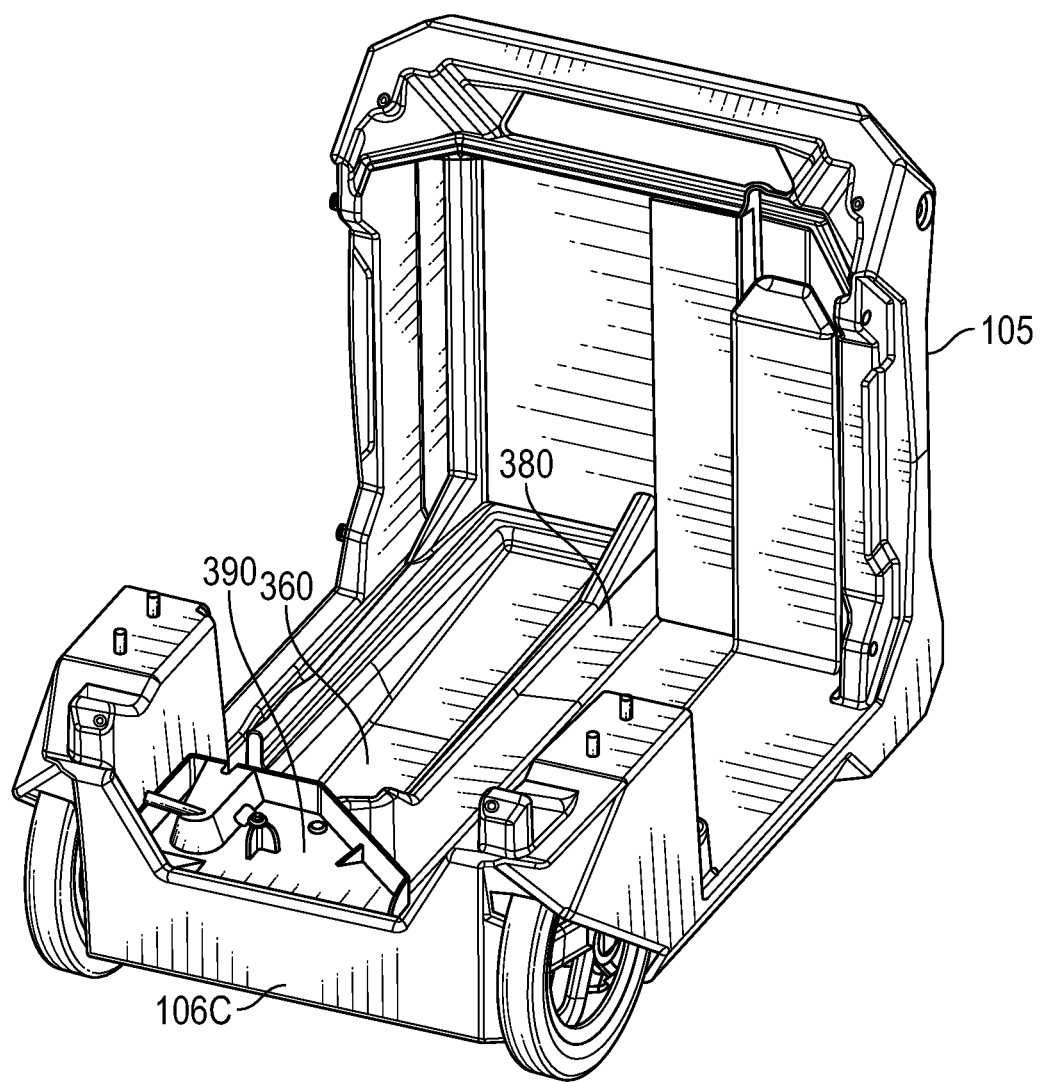
Figure 3F:
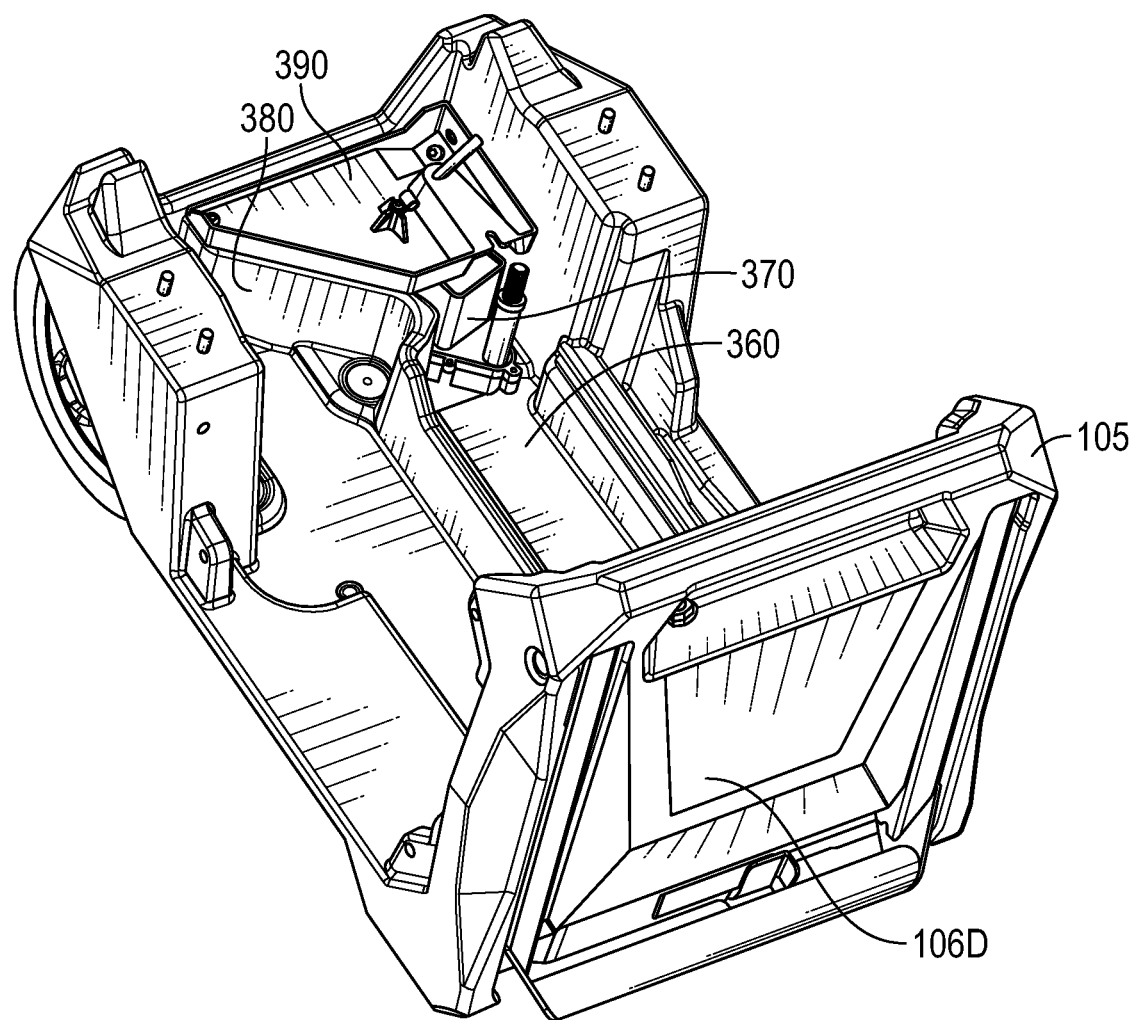
Figure 4:
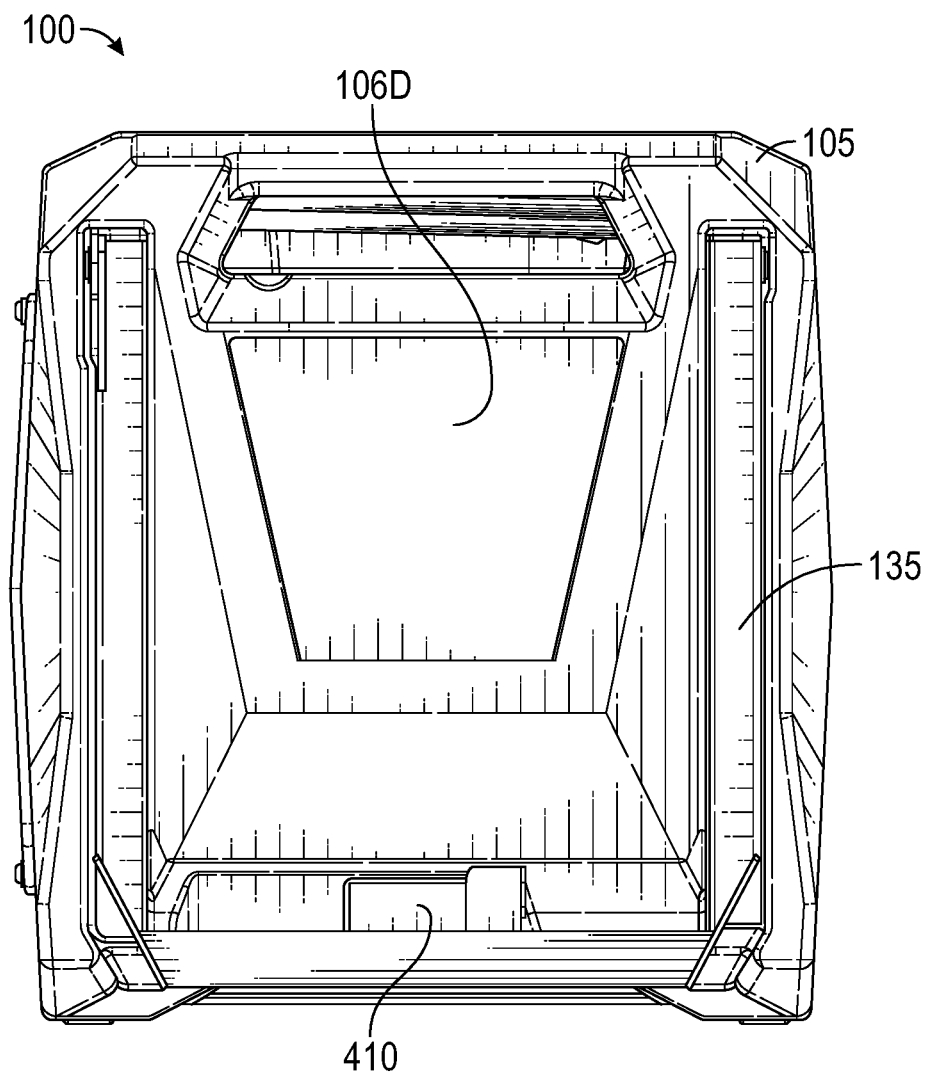
FIGS. 4-6 illustrate various positions of a pivoting handle of the portable dehumidifier of FIGS. 1-2, according to certain embodiments.

FIGS. 3A-3F illustrate various cut-away views of portable dehumidifier 100, according to certain embodiments. FIG. 3A is a cut-away top-down view of portable dehumidifier 100, FIGS. 3B-3C are cut-away perspective views of portable dehumidifier 100. FIG. 3D is a cut-away sectioned view of portable dehumidifier 100, and FIGS. 3E-3F are cut-away perspective views of cabinet 105 (i.e., portable dehumidifier 100 with most internal components removed). As illustrated in these figures, portable dehumidifier 100 includes various components to provide dehumidification to airflow 101. In some embodiments, portable dehumidifier 100 includes a compressor 320 and a dehumidification system 300 that may include a secondary evaporator 325, a primary evaporator 330, a secondary condenser 340, and a primary condenser 350. In some embodiments, dehumidification system 300 may be dehumidification system 300 as described in U.S. patent application Ser. No. 15/460,772, filed Mar. 16, 2017 and entitled "Dehumidifier with Secondary Evaporator and Condenser Coils," which is incorporated herein by reference in its entirety. These and other internal components of portable dehumidifier 100 are uniquely arranged so as to minimize the size and maximize the effectiveness of portable dehumidifier 100. In some embodiments, air filter 310 is located inside cabinet 105 adjacent to airflow inlet 110, and fan 117 is located adjacent to airflow outlet 115. Fan 117 generates airflow 101 that flows from airflow inlet 110 to airflow outlet 115 within cabinet 105. Secondary evaporator 325 is located adjacent to air filter 310 and receives airflow 101 from air filter 310. Primary evaporator 330 is located adjacent to secondary evaporator 325 and receives airflow 101 from secondary evaporator 325. Secondary condenser 340 is located between primary evaporator 330 and primary condenser 350 and receives airflow 101 from primary evaporator 330. Primary condenser 350 is located adjacent to fan 117 and receives airflow 101 from secondary condenser 349. Compressor 320 may be located adjacent to front side 106C of cabinet 105 as illustrated. In general compressor 320 is not within airflow 101 in certain embodiments.

FIG. 3D is a cut-away sectioned view of portable dehumidifier 100, and FIGS. 3E-3F are cut-away perspective views of cabinet 105. These figures illustrate various features of portable dehumidifier 100 for storing and disposing of water extracted from airflow 101 by dehumidification system 300. In some embodiments, portable dehumidifier 100 includes drain pan 360 located at the bottom of cabinet 105 at least partially below dehumidification system 300. In some embodiments, drain pan 360 is integrally-formed as a part of cabinet 105. In other embodiments, drain pan 360 may be a separate drain pan unit that is coupled to cabinet 105. Drain pan 360, in general, is configured to hold water that is condensed from dehumidification system 300.

In some embodiments, portable dehumidifier 100 includes a drain pump 370 is located at least partially within drain pan 368. In some embodiments, drain pump 370 is located adjacent to front side 106C of cabinet 105. In general, drain pump 370 is any appropriate electrical pump that is configured to pump water from drain pan 360 and out of portable dehumidifier 100 (e.g., via an attached hose).

In some embodiments, portable dehumidifier 100 includes a drain pan cover 390 that is located adjacent to front side 106C of cabinet 105. In some embodiments, drain pan cover 390 is configured to secure drain pump 370 in place. In such embodiments, drain pan cover 390 may include various features (e.g., indentations, ridges, etc.) that correspond to various features of drain pump 378 in order to secure drain pump 370 in place. In some embodiments, drain pump 370 may be fastened to drain pan cover 390 using my appropriate fasteners in order to secure dram pump 370 in place. In general, drain pan cover 390 covers a front portion of drain pan 360 that is adjacent to front side 106C of cabinet 105. This prevents water that is stored in drain pan 360 from spilling out of portable dehumidifier 100 when portable dehumidifier 100 is tilted towards front side 106C during transport.

In some embodiments, portable dehumidifier 100 includes a wall 380 as illustrated in FIGS. 3D-3H. In general, wall 380 is located at least partially between secondary condenser 340 and primary condenser 350. In some embodiments, wall 380 extends from an inside bottom surface of cabinet 105 to a height that is less than a height of primary condenser 350. In some embodiments, wall 380 is less than one-fourth the height of primary condenser 350. In general, wall 380 forms at least a portion of drain pan 360 and prevents water from exiting portable dehumidifier 100 via airflow outlet 115. As water is removed from airflow 101 via dehumidification system 300, it falls via gravity to the bottom of cabinet 105 and into drain pan 360 where is may be later removed from portable dehumidifier 100. By having wall 380 being integrated into cabinet 105 and forming a portion of drain pan 360, valuable space may be saved within portable dehumidifier 100. This further helps reduce the overall size and footprint of portable dehumidifier 100.

In some embodiments, wall 380 wraps at least partially around a bottom portion 321 of compressor 320. This is best illustrated in FIG. 3D. In addition to helping secure compressor 320, this curved feature of wall 380 further helps reduce the overall size and footprint of portable dehumidifier 100 by allowing compressor 320 to be moved closer to the middle of cabinet 105.

In some embodiments, portable dehumidifier 100 includes features that permit an operator to claim ownership of portable dehumidifier 100. For example, portable dehumidifier 100 may include a computing system (e.g., computer system 1100) and a communications interface (e.g., communication interface 1110) that permits portable dehumidifier 100 to communicate wirelessly (e.g., Bluetooth, BLE, or Wi-Fi) to another computing system such as a smartphone or tablet computer. To claim ownership of portable dehumidifier 100, an operator may download and install a dedicated application ("app") to their device and then register for an account using the app. Once registered with the app, the operator may establish a wireless communications link with portable dehumidifier 100 using the communications interface (e.g., connect to portable dehumidifier 100 using Bluetooth) and claim ownership of portable dehumidifier 100. Once connected, the operator may view the current status/performance history of portable dehumidifier 100 and control various operations of portable dehumidifier 160. In some embodiments, the purchaser of portable dehumidifier 100 may associate portable dehumidifier 100 with a particular company. By using this feature, only employees of the particular company may be permitted to connect to portable dehumidifier 100 and view the current status/performance history of portable dehumidifier 100 and control the operation of portable dehumidifier 100.

Although not illustrated, some embodiments of portable dehumidifier 100 may include multiple sensors to sense various aspects of airflow 101 and the environment. For example, portable dehumidifier 100 may include multiple sensors such as thermometers, humidistats, and the like. In some embodiments, portable dehumidifier 100 may include a sensor to sense conditions of the ambient air before it is dehumidified by portable dehumidifier 100. Such a sensor may be installed anywhere in airflow 101 prior to airflow 101 entering secondary evaporator 325 (e.g., anywhere between airflow inlet 110 and secondary evaporator 325). In some embodiments, portable dehumidifier 100 may include a sensor to sense conditions of airflow 101 as it is exhausted out of airflow outlet 115. Such a sensor may be installed anywhere in airflow 101 after airflow 101 exits primary condenser 350 (e.g., anywhere between primary condenser 350 and airflow outlet 115). In some embodiments, portable dehumidifier 100 may include a sensor to sense the temperature of primary evaporator 330. This sensor may be installed, anywhere proximate to primary evaporator 330.

Figure 5:
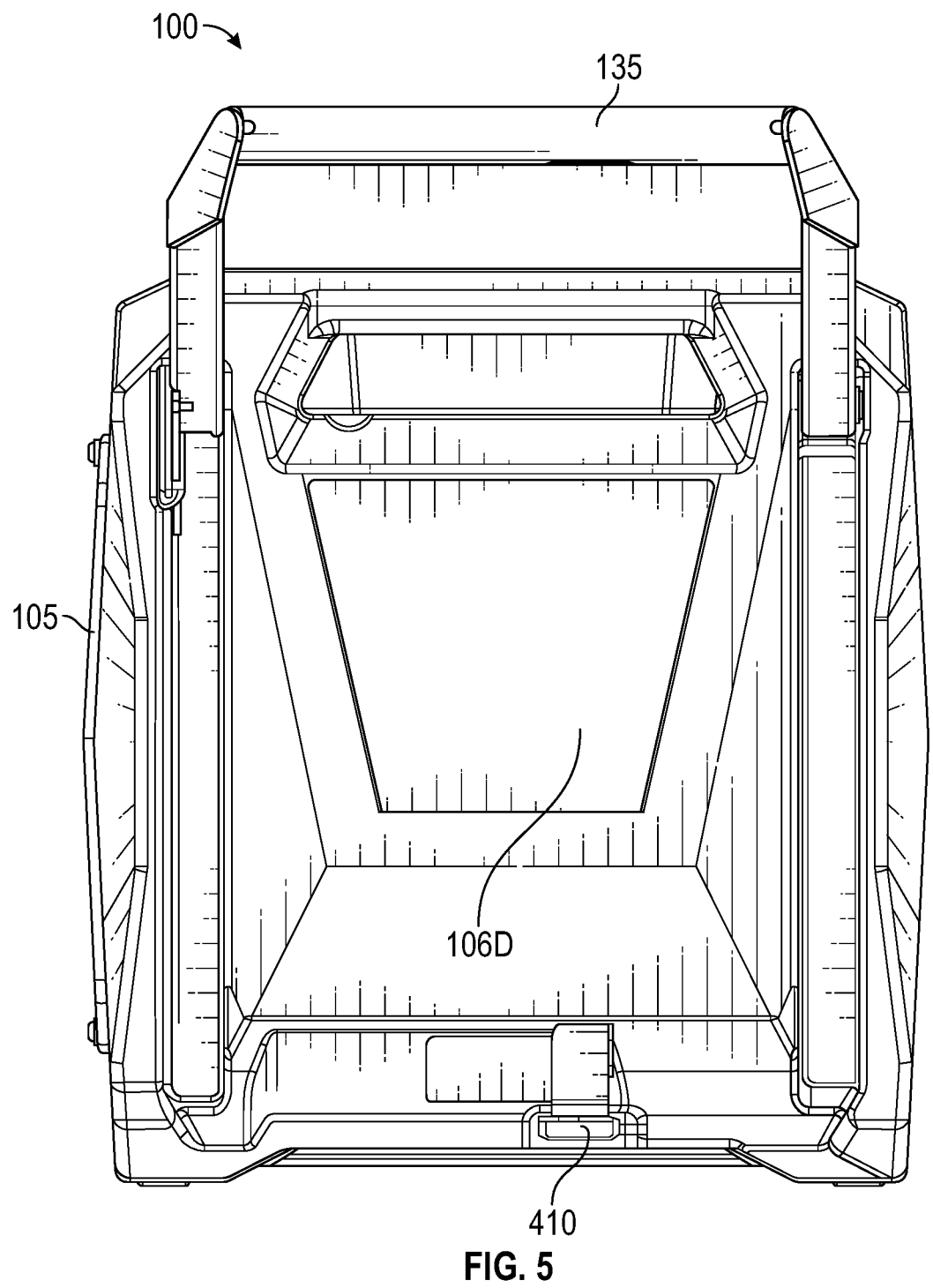
Figure 6:
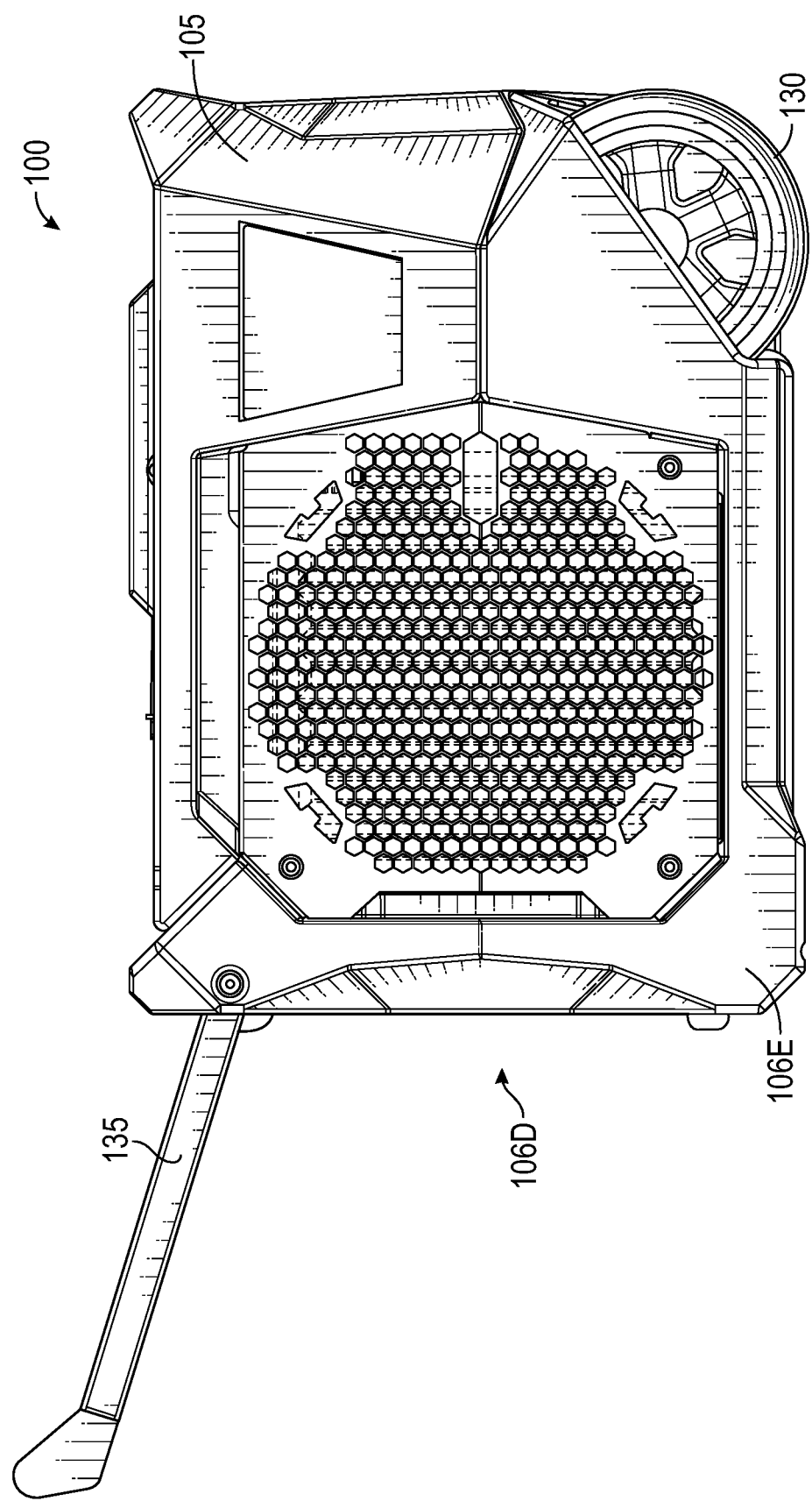

FIGS. 4-7G illustrate details of pivoting handle 135 while pivoting handle 135 is in various positions. In general, pivoting handle 135 may be used to tilt portable dehumidifier 100 towards it front side 106C and then rolled to a new location on wheels 130. In general, pivoting handle 135 provides a solution to a collapsible handle that is rigid and is held in multiple positions. To operate pivoting handle 135, an operator may push a locking latch 410 to the side (FIG. 7G) to unlock pivoting handle 135 from its stored position (FIGS. 4 and 7C) and enable it to pivot upwards toward top side 106A. Once pivoting handle 135 has been unlocked, some embodiments of portable dehumidifier 100 utilize a torsion spring (not illustrated) to pivot pivoting handle 135 upwards toward the operator. The operator grasps pivoting handle 135 and pivots pivoting handle 135 upwards until it stops into an engaged position (e.g., approximately fifteen degrees above vertical). The engaged position of pivoting handle 135 is illustrated in FIGS. 5-6 and 7B. Pivoting bundle 135 is locked into its engaged position by a cam arm 720, described in more detail below. Once pivoting handle 135 is in its engaged position, the operator may tilt portable dehumidifier 100 towards front side 106C and transport portable dehumidifier 100 using wheels 130. Once no longer needed, pivoting handle 135 may be pivoted downwards and back into its stored position (e.g., flat against back side 106D). Once in its stored position, latch 410 automatically rotates to engage pivoting handle 135 and lock it in its stored position (FIG. 7F).

As illustrated in FIGS. 7A-7G, some embodiments of pivoting handle 135 include a cross member 710, two extension members 715, and a cam arm 720. Cross member 710 is any appropriate shape that allows for an operator to hold cross member 710 while transporting portable dehumidifier 100. In some embodiments, cross member 710 includes a material (e.g., paint) or surface design that makes pivoting handle 135 suitable for gripping by an operator. In some embodiments, cross member 710 may be attached to extension members 715 using any appropriate fastener (e.g., screws, bolts, etc.) or may be permanently attached to extension members 715 using, for example, welding. Cross member 710, extension members 715, and cam arm 720 may be made of any appropriate material such as metal or plastic.

In some embodiments, cam arm 720 includes a spring arm 730, a clearance hole 740, an aperture 755 for a pivot pin 760, and a compression gap 780. Spring arm 730 may include an indentation 790 and a straight edge 735. Pivot pin 760, which may be any appropriate fastener such as a shoulder bolt, is inserted through aperture 755 and into a pivot plate 750 in order to secure cam arm 720 to cabinet 105 and to provide a pivot point for cam arm 720 to pivot. Indentation 790 and straight edge 735 of spring arm 730 engages with a locking pin 770 at various times while pivoting handle 135 is being pivoted. Locking pin 770 is any appropriate fastener or protrusion coupled to pivot plate 750. In some embodiments, a bearing 775 is coupled to locking pin 770 and is configured to contact spring arm 730 and rotate about locking pin 770.

Spring arm 730 may have any appropriate shape to allow cam arm 720 to engage locking pin 770 at various points while pivoting handle 135 is pivoting upwards. In some embodiments, spring arm 730 is a finger-shaped pretension as illustrated in FIGS. 4-7G and includes indentation 790 at an end of spring arm 730. Indentation 790 is any appropriate feature at the end of spring arm 730 to engage with locking pin 770 and lock pivoting handle 135 in its engaged position (see FIG. 7B). Compression gap 780 is adjacent to spring arm 730 and is located between spring arm 730 and aperture 755. Compression gap 780 is any appropriate shaped gap in cam arm 720 that allows spring arm 730 to compress towards pivot pin 760 and therefore act as a spring. This provides positive feedback and resistance to pivoting handle 135 as it is pivoted upwards to it engaged position.

Figure 7A:
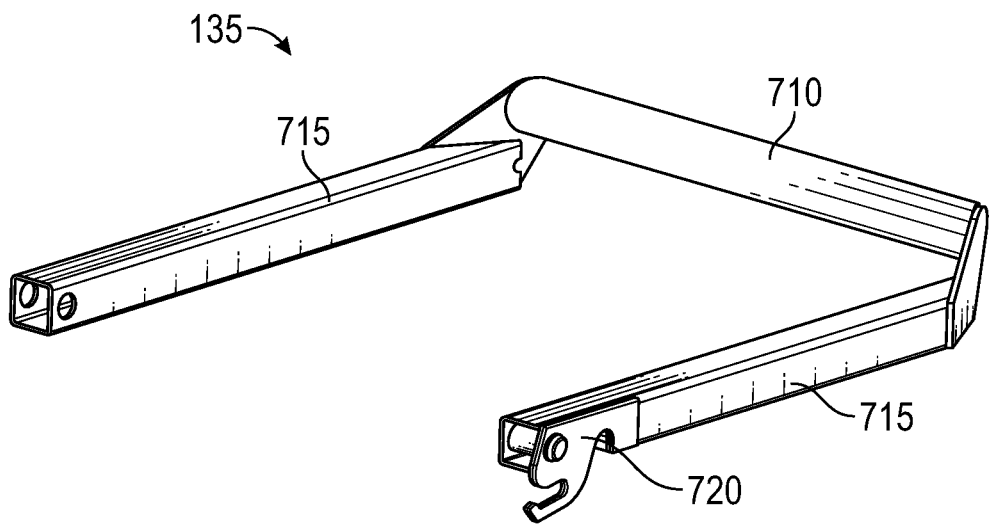
FIGS. 7A-7G illustrate more details of the pivoting handle of FIGS. 4-6, according to certain embodiments.
Figure 7B:
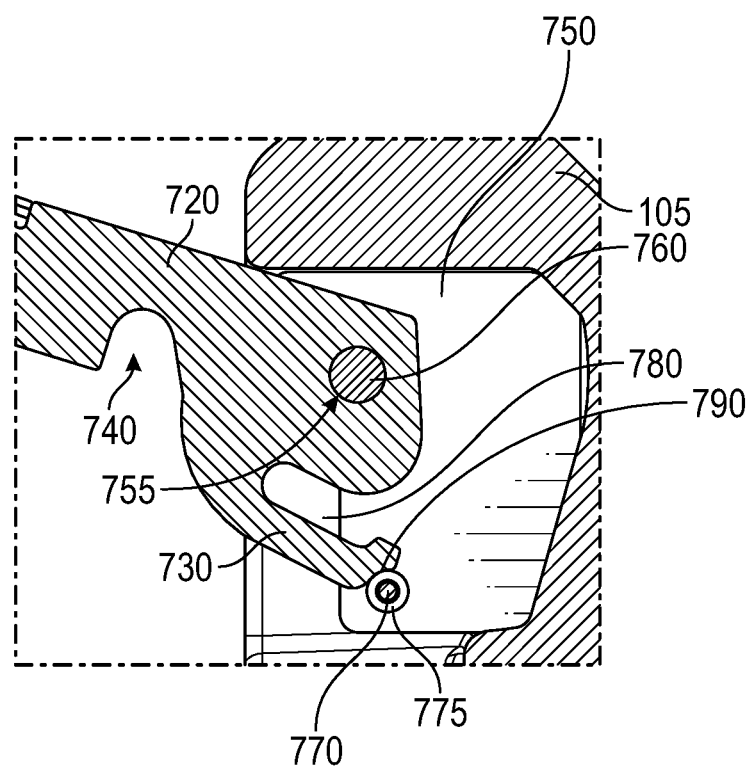
Figure 7C:
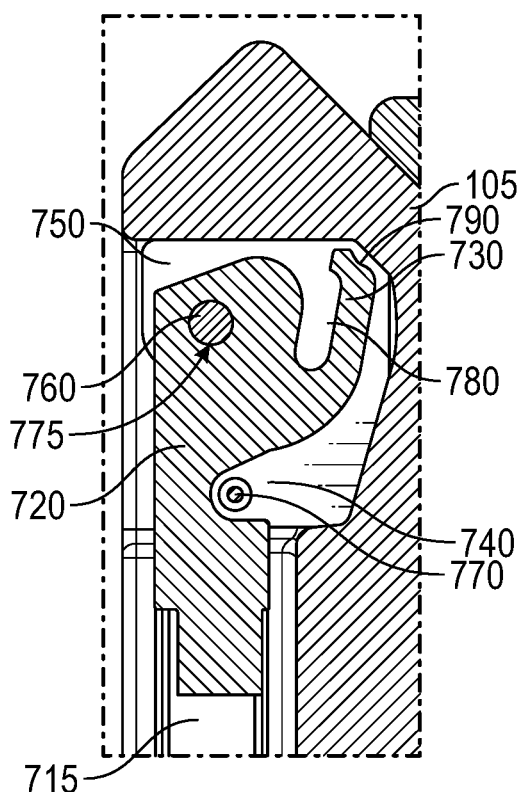
Figure 7D:
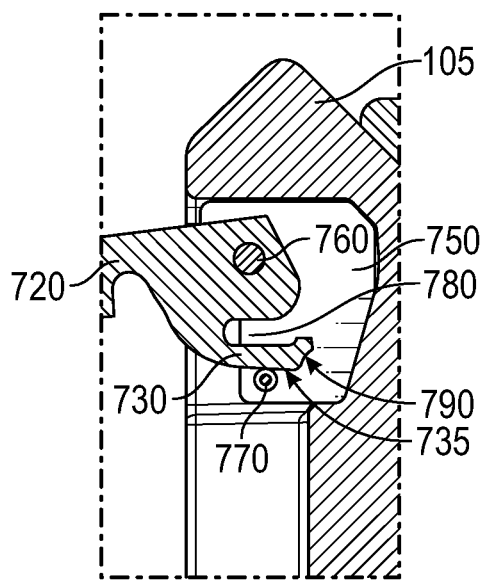
Figure 7E:
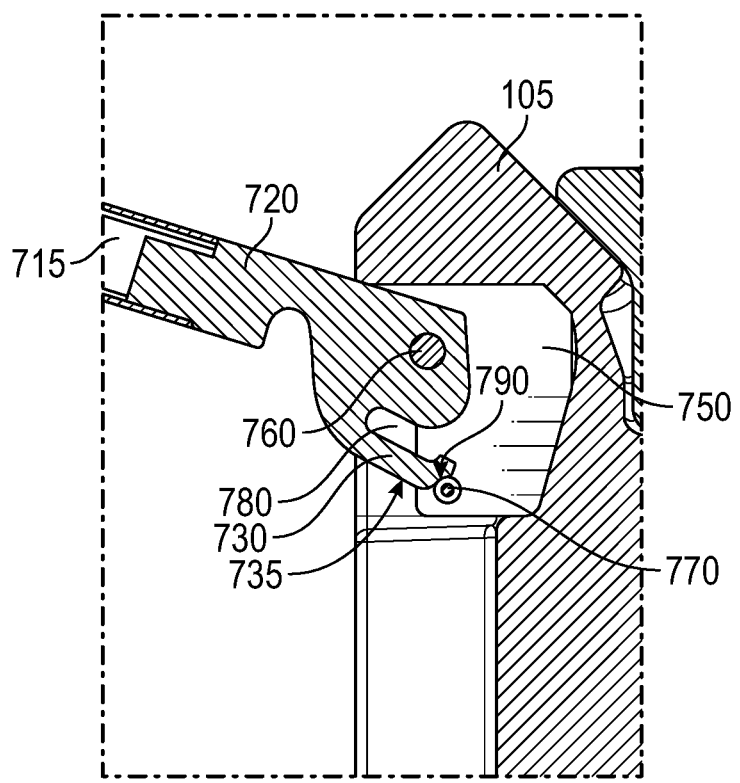
Figure 7F:
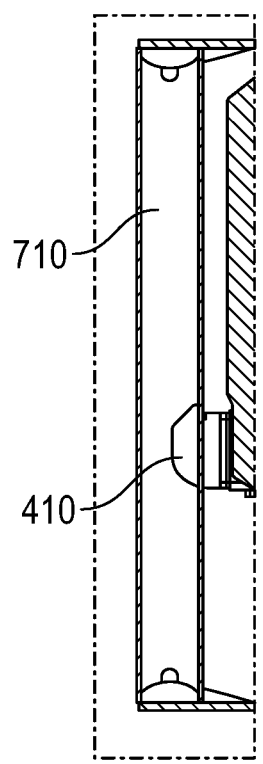
Figure 7G:
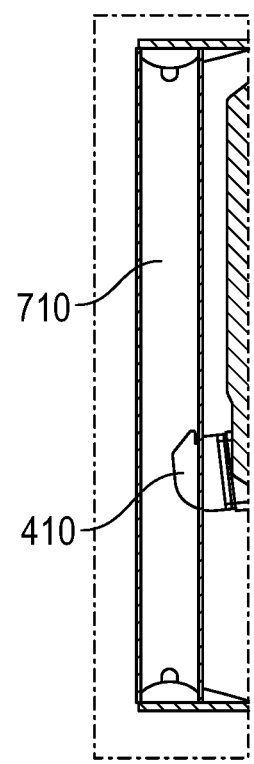

Clearance hole 740 is any gap in cam arm 720 that permits, cam arm 720 to clear locking pin 770 when pivoting handle 135 is in the stored position (see FIG. 7C). In other words, clearance hole 740 prevents cam arm 720 from contacting locking pin 770 when pivoting handle 135 is pivoted from its engaged position to its stored position. Clearance hole 740 may have any appropriate shape, but is generally larger than locking pin 770. Clearance hole 740 is located between an end of extension member 715 and pivot pin 760.

In operation, pivoting handle 135 is typically in the stored position when not in use (see FIG. 7C). In the stored position, pivoting handle 135 lays flat against hack side 106D of cabinet 105. In addition, as illustrated in FIG. 7C, clearance hole 740 prevents cam arm 720 from contacting locking pin 770 while pivoting handle 135 is in the stored position. When an operator desires to move portable dehumidifier 100 to a new location, the operator may push locking latch 410 to the side (see FIG. 7G) to unlock pivoting handle 135 from its stored position and enable pivoting handle 135 to pivot upwards toward top side 106A. The operator then grasps pivoting handle 135 and pivots pivoting handle 135 upwards. While pivoting handle 135 is being pivoted upwards, straight edge 735 of spring arm 730 begins contacting locking pin 770 (sec FIG. 7D). This permits spring arm 730 to slide along locking pin 770. While sliding along locking pin 770, spring arm 730 begins compressing into compression gap 780. This spring action of spring arm 730 provides positive feedback and resistance to pivoting handle 135 during pivoting. Once pivoting handle 135 is pivoted upwards further, indentation 790 will engage locking pin 770. This stops the pivoting of pivoting handle 135 and locks pivoting handle 135 into its engaged position (see FIG. 7E). At the engaged position, indentation 790 of spring arm 730 provides enough holding strength to hold up the weight of pivoting handle 135 without requiring the operator to hold up pivoting handle 135. In addition, the spring action of spring arm 730 and the shape of indentation 790 allows pivoting handle 135 to "pop" into its engaged position. This provides confirmation to the operator that pivoting handle 135 has been sufficiently pivoted into the engaged position. Once pivoting handle 135 is in its engaged position, the operator may tilt portable dehumidifier 100 towards front side 106C and transport portable dehumidifier 100 using wheels 130. Once no longer needed, pivoting handle 135 may be pivoted downwards and back into its stored position (e.g., flat against back side 106D). Once in its stored position, latch 410 automatically rotates to engage pivoting handle 135 and lock it in its stored position (see FIG. 7F).

Figure 8A:
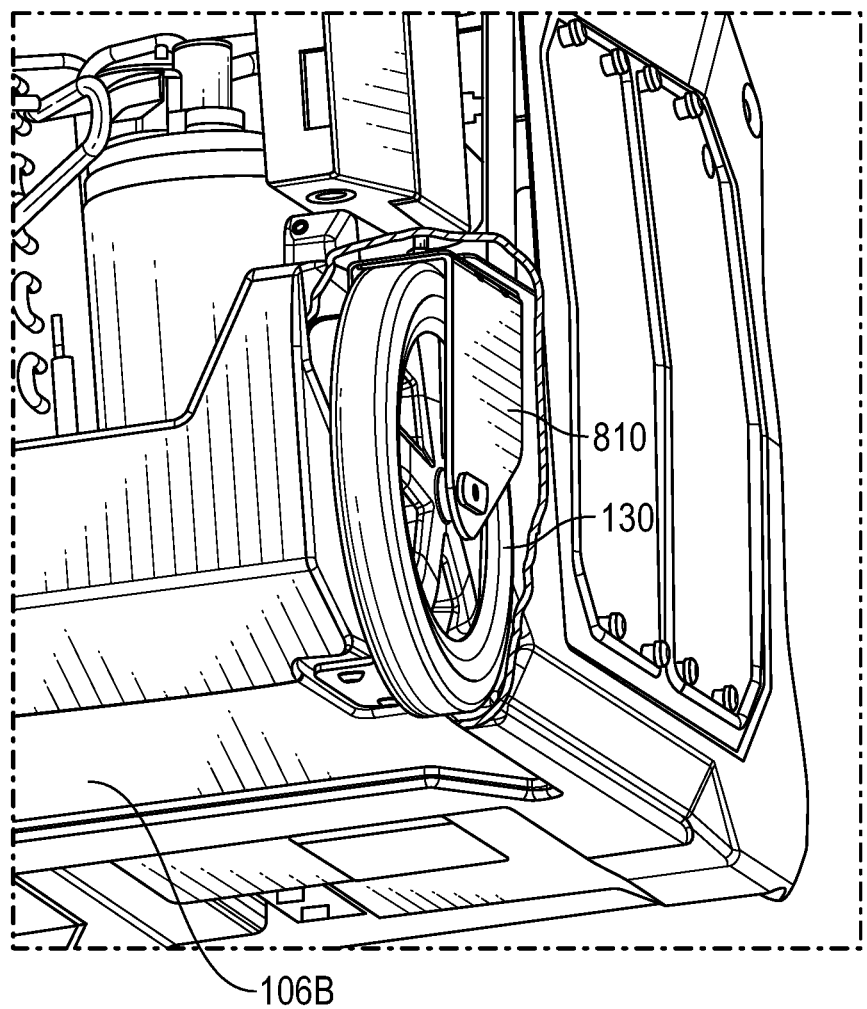
FIGS. 8A-8D illustrate a wheel mounting bracket assembly of the portable dehumidifier of FIGS. 1-2, according to certain embodiments.
Figure 8B:
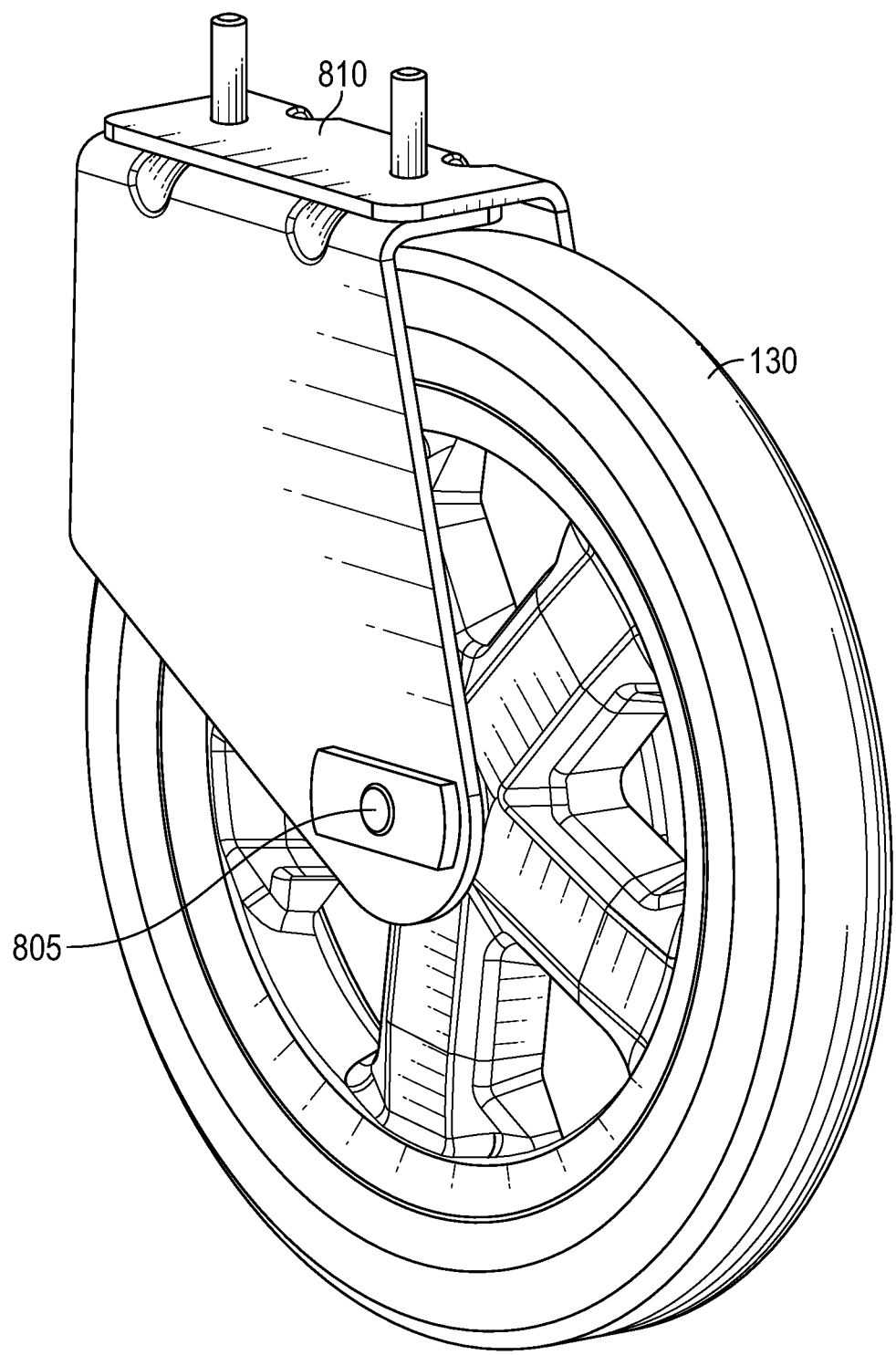
Figure 8C:
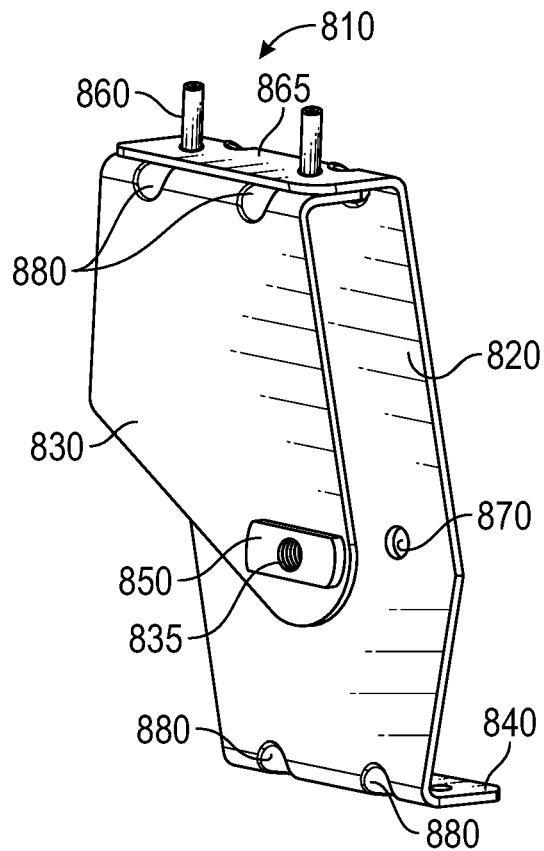
Figure 8D:
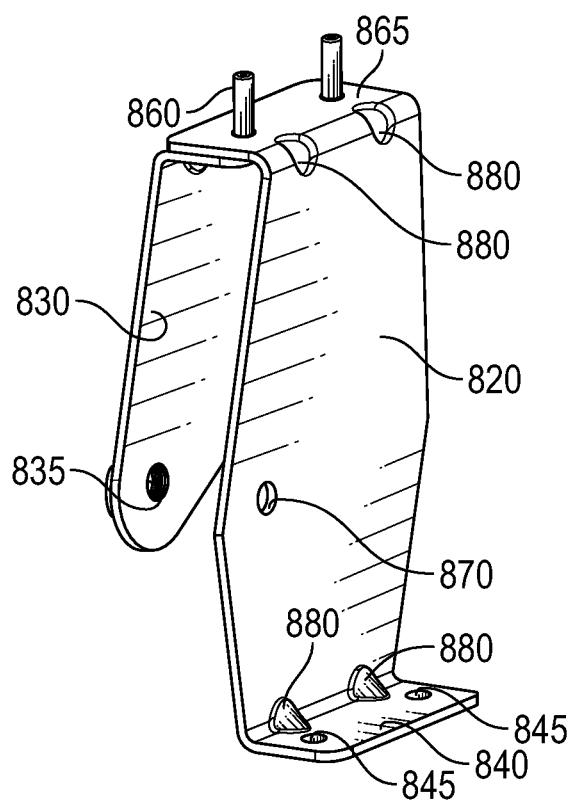

FIGS. 8A-8D illustrate a wheel mounting bracket assembly 810 of portable dehumidifier 100, according to certain embodiments. In general, certain embodiments of portable dehumidifier 100 utilize two unique wheel mounting bracket assemblies 810 that enable wheels 130 to be mounted partially within and very close to cabinet 105 of portable dehumidifier 100. For example, wheels 130 may be partially covered by skirts 131 as illustrated in FIGS. 1-2. Skirts 131 may be, for example, integrally-formed portions of cabinet 105 or may be separate components that are coupled to cabinet 105 during assembly. This increases the compactness and ruggedness of portable dehumidifier 100. FIG. 8A provides a cut-away view of cabinet 105 showing how wheel mounting bracket assembly 810 is coupled to cabinet 105 in some embodiments. FIG. 8B provides an isolated view of wheel mounting bracket assembly 810 and a wheel 130 that is coupled to wheel mounting bracket assembly 810 using an axle 805. FIGS. 8C-8D, which are discussed in more detail below, provide more details on specific embodiments of wheel mounting bracket assembly 810.

As illustrated in FIGS. 8C-8D, some embodiments, of wheel mounting bracket assembly 810 include an inside member 820, an outside member 830, a bottom member 840, and a top member 865. Inside member 820 is installed proximate to one of the sides of cabinet 105 and is closer to the inferior of cabinet 105 than outside member 830. In some embodiments, inside member 820 includes a first axle aperture 870 that is configured to accept one end of axle 805. Axle 805 is generally configured to secure one of wheels 130 to cabinet 165.

In some embodiments, bottom member 840 is coupled to an end of inside member 820 that is opposite from top member 865. When wheel mounting bracket assembly 810 is installed in portable dehumidifier 100, bottom member 840 contacts a portion of bottom side 106B of cabinet 105. In some embodiments, bottom member 840 includes one or more mounting apertures 845 that are configured to permit one or more fasteners to couple wheel mounting bracket assembly 810 to bottom side 106B of cabinet 105. For example, some embodiments of bottom member 840 include two mounting apertures 845 that permit two fasteners (e.g., screws or bolts) to couple wheel mounting bracket assembly 810 to cabinet 105.

In some embodiments, top member 865 couples inside member 820 to outside member 830. In some embodiments, top member 865 includes one or more locating pins 860 that are configured to be inserted into one or more locating apertures (not illustrated) in cabinet 105. For example, some embodiments of wheel mounting bracket assembly 810 include two threaded locating pins 860 (e.g., bolts, screws, or pins that are otherwise coupled to top member 865) that may be inserted into locating apertures of cabinet 105. The locating apertures may be any appropriate receptacle for locating pins 860 and function to align and secure wheel mounting bracket assembly 810 within cabinet 105. In some embodiments, top member 865 is two separate portions: one portion that is coupled to an end of inside member 820 that is opposite to bottom member 840, and a second portion that is coupled to an end of outside member 830 that is opposite second axle aperture 835. In such embodiments, wheel mounting bracket assembly 810 is formed from two separate pieces that are welded or otherwise coupled together: inside member 820 and outside member 830. In other embodiments, wheel mounting bracket assembly 810 is a single bracket that is formed from a single piece of metal. An example of such embodiments is discussed below in reference to FIGS. 9A-9B.

In some embodiments, wheel mounting bracket assembly 810 includes an outside member 830 that is closer to an outside of cabinet 105 with respect to inside member 820 when wheel mounting bracket assembly 810 is installed in cabinet 105. In some embodiments, outside member 830 includes a second axle aperture 835 that is configured to accept another end of axle 805. In some embodiments, outside member 830 includes a weld nut 850 coupled to an outside surface of outside member 830 as illustrated. Weld nut 850 may be used to secure axle 805 and may include a threaded aperture that is aligned with second axle aperture 835. In some embodiments, outside member 830 is shorter than inside member 820 as illustrated in the figures.

In some embodiments, wheel mounting bracket assembly BIO includes multiple gussets 880. For example, some embodiments include one or more first gussets 880 that are located at an edge between inside member 820 and bottom member 840, one or more second gussets 880 that are located at an edge between inside member 820 and top member 865, and one or more third gussets 880 that are located at an edge between outside member 830 and top member 865. In general, gussets 880 give strength and structural support to the various members of wheel mounting bracket assembly 810.

Figure 9A:
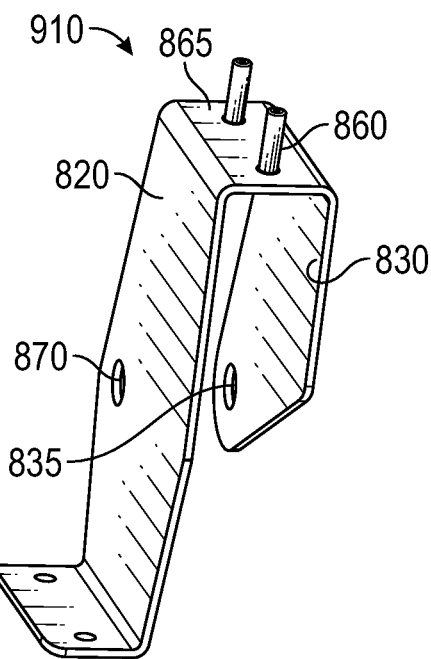
Figure 9B:
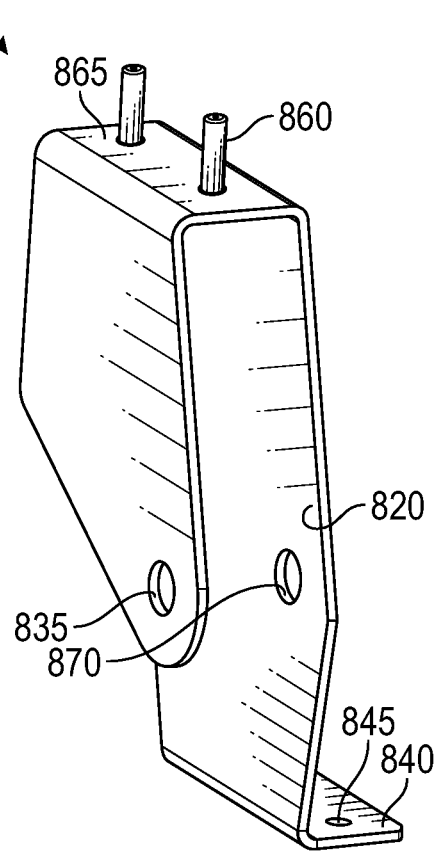

FIGS. 9A-9B illustrate a wheel mounting bracket 910 according to certain embodiments. In general, wheel mounting bracket 910 is similar to wheel mounting bracket assembly 810. However, unlike wheel mounting bracket assembly 810 which may be formed from two separate pieces of metal that are coupled together at top member 865, wheel mounting bracket 910 may be formed from a single piece of metal. This may provide for lower material and assembly costs for portable dehumidifier 100.

Figure 10:
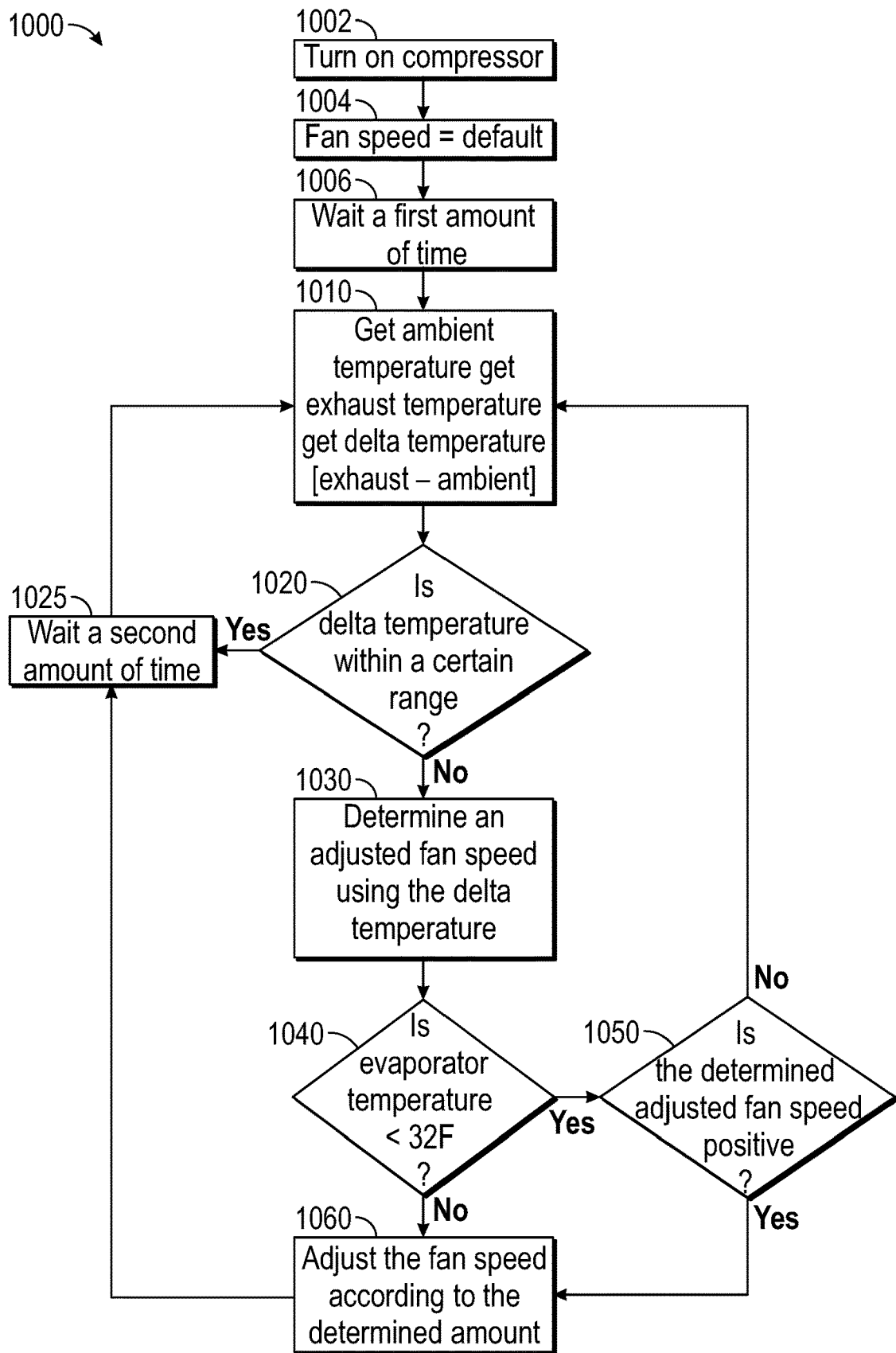
FIG. 10 illustrates a fan control method that may be used by the portable dehumidifier of FIGS. 1-2, according to certain embodiments.
Figure 11:
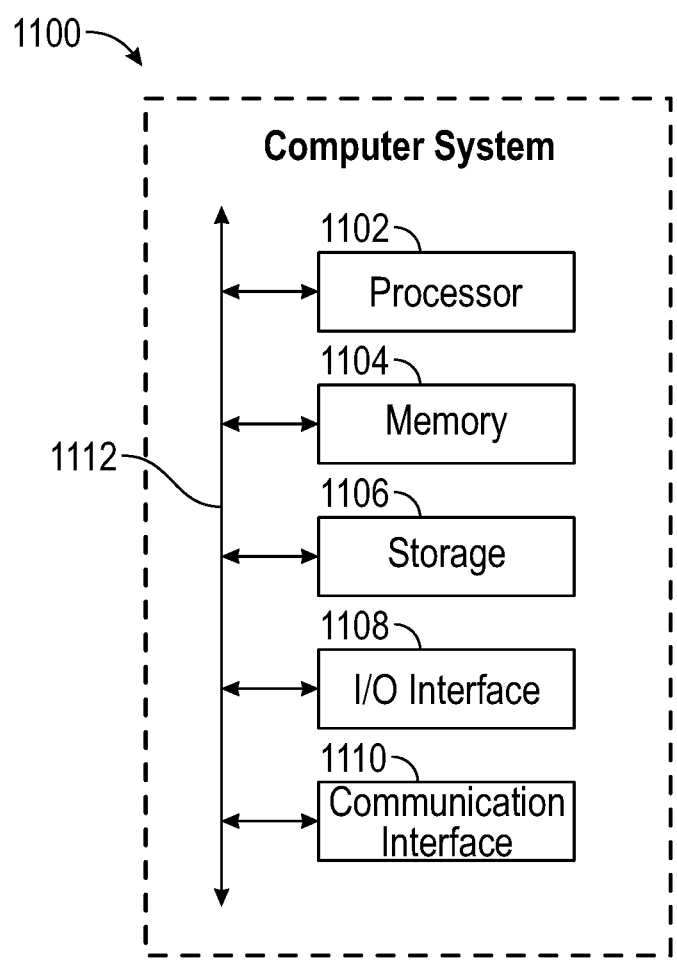
FIG. 11 illustrates a computing system that may be used by the portable dehumidifier of FIGS. 1-2, according to certain embodiments.

FIG. 10 illustrates a tan control method 1000 that may be used by portable dehumidifier 100, according to certain embodiments. In general, fan control method 1000 provides for a unique method for controlling the speed of fan 117. For each ambient temperature, there is a minimum temperature difference between, the exhaust temperature and the ambient temperature that portable dehumidifier 100 will try to maintain by adjusting the speed of fan 117. If the temperature difference falls below the minimum allowed at that ambient temperature, portable dehumidifier 100 will slow the speed of fan 117 to maintain the temperature difference. A particular embodiment of fan control method 1000 is discussed in more detail below in reference to the flow chart illustrated In FIG. 10.

At step 1002, which is an optional step in some embodiments, method 1000 turns on compressor 320. At step 1004, which may also be an optional step in some embodiments, method 1000 sets the speed of fan 117 to a default fan speed. In some embodiments, the default fan speed may be a maximum fan speed, a minimum fan speed, a fan speed associated with a quiet-mode of portable dehumidifier 100, or any other fan speed between the minimum and maximum fan speed. At step 1006, which may also be an optional step in some embodiments, method 1000 waits a first predetermined amount of time. In some embodiments, the first predetermined amount of time may be zero seconds or less, greater than zero seconds but less than or equal to five minutes, or greater than five minutes but less than or equal to ten minutes. After step 1006, method 1000 may proceed to step 1010.

At step 1010, method 1000 performs a first step of obtaining an ambient temperature, obtaining an exhaust temperature, and calculating or otherwise obtaining a delta temperature which is a difference between the ambient temperature and the exhaust temperature. In some embodiments, the ambient temperature is obtained from a temperature sensor located anywhere within airflow 101 prior to dehumidification system 300, and the exhaust temperature is obtained from a temperature sensor located anywhere within airflow 101 after dehumidification system 300.

After step 1010, method 1000 may proceed to step 1020 where the delta temperature of step 1010 is compared to a predetermined delta temperature range. If the delta temperature of step 1010 is within the delta temperature range, method may proceed to step 1025. Otherwise, if the delta temperature is not within the delta temperature range, method 1000 may proceed to step 1030. In some embodiments, step 1020 includes determining whether the delta temperature of step 1010 is greater than or equal to 20 degrees Fahrenheit (plus or minus 10%) and less than or equal to 23 degrees Fahrenheit (plus or minus 10%). In some embodiments, the delta temperature range is a predetermined a constant range. In other embodiments, the delta temperature range is a variable range based on the ambient temperature.

At step 1025, method 1000 waits a second predetermined amount of time. The second predetermined amount of time may be, for example, zero seconds or less, greater than zero seconds hut less than or equal to one minute, greater than one minute but less than or equal to five minutes, or greater than five minutes. After step 1025, method 1000 proceeds back to step 1010.

At step 1030, method 1000 performs a second step of determining an adjusted fan speed using the delta temperature of step 1010. In some embodiments, determining the adjusted fan speed using the delta temperature of this step includes calculating an adjusted delta by subtracting a target delta constant from the delta temperature of step 1010 and then calculating the adjusted fan speed by multiplying the adjusted delta by a fan unit constant. The target delta constant may be, for example 21.5 degrees Fahrenheit (plus or minus 20%). In some embodiments, the fan unit constant is a number of fan units per degree Fahrenheit (e.g., three fan units per degree Fahrenheit). The fan units may correspond to a number of rotations per minute (RPM) or cubic feet per minute (CFM).

After step 1030, method 1000 may proceed to step 1040 where portable dehumidifier 100 determines whether an evaporator temperature is less than a predetermined temperature. In some embodiments, the evaporator temperature is a measurement of the temperature of primary evaporator 330 and is performed by any appropriate temperature sensor located proximate to primary evaporator 330. In some embodiments, the predetermined temperature is the water/ice point (i.e., 32 degrees Fahrenheit). If the evaporator temperature is not less than the predetermined temperature, method 1000 proceeds to step 1060. However, if the evaporator temperature is less than the predetermined temperature, method 1000 proceeds to step 1050.

At step 1050, method 1000 determines if the adjusted fan speed determined in step 1040 is positive (i.e., faster) or negative (i.e., slower) with respect to the current fan speed. If the adjusted fan speed is positive, method 1000 proceeds to step 1060. If the adjusted fan speed is negative or identical, method 1000 proceeds back to step 1010.

At step 1060, method 1000 performs a third step of setting the speed of fan 117 to the adjusted fan speed determined in step 1030. After step 1060, method 1000 proceeds to step 1025 where method 1008 waits the second predetermined amount of time before proceeding back to step 1010.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10 (including computer system 1100 described below).

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 110(*c*); be unitary or distributed; span multiple locations; span multiple machines; span multiple data centers, or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1186 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing, one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based ox other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses ail changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of my of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A portable dehumidifier, comprising:
    a cabinet comprising:
        a front side and a back side opposite the front side;
        an airflow inlet located on a first side of the cabinet; and
        an airflow outlet located on a second side of the cabinet that is opposite the first side;
    two wheels coupled to the front side of the cabinet;
    a pivoting handle configured to pivot from a stored position to an engaged position, the pivoting handle comprising:
        a cross member configured to permit a user to grip the pivoting handle;
        two extension members, each extension member coupled to a respective end of the cross member; and
        a cam arm coupled to one of the extension members at an end of the extension member that is opposite the cross member, the cam arm comprising:
            a spring arm configured to engage with a locking pin coupled to the cabinet;
            a clearance hole configured to permit the cam arm to clear the locking pin when the pivoting handle is in the stored position;
            an aperture configured to permit a pivot pin to secure the cam arm to the cabinet, the cam arm configured to pivot about the pivot pin; and
            a compression gap adjacent to the spring arm, the compression gap configured to permit the spring arm to provide resistance to the pivoting handle during pivoting;
    wherein:
        the pivoting handle is coupled to a top portion of the back side of the cabinet;
        the pivoting handle is configured to lay flat against the back side of the cabinet when in the stored position; and
        the pivoting handle is configured to pivot upwards towards the top portion of the back side of the cabinet when the pivoting handle is pivoted into the engaged position.

2. The portable dehumidifier of claim 1, further comprising a pivot plate coupled to the cabinet, the pivot plate comprising:
    the locking pin; and
    a second aperture configured to permit the pivot pin to secure the cam arm to the cabinet via the pivot plate.

3. The portable dehumidifier of claim 1, further comprising a latch configured to secure the pivoting handle in the stored position, the latch coupled to a bottom portion of the back side of the cabinet.

4. The portable dehumidifier of claim 1, wherein the spring arm comprises an indentation located on one end of the spring arm, the indentation configured to engage with the locking pin and secure the pivoting handle in the engaged position.

5. The portable dehumidifier of claim 1, wherein the locking pin comprises a bearing coupled to the locking pin, the bearing configured to rotate about the locking pin.

6. The portable dehumidifier of claim 5, wherein the spring arm comprises a straight edge that is configured to slide along the bearing of the locking pin while the pivoting handle is being pivoted.

7. The portable dehumidifier of claim 1, wherein the pivot pin comprises a shoulder bolt.

8. A portable dehumidifier, comprising:
    a cabinet comprising a front side and a back side opposite the front side;
    two wheels coupled to the front side of the cabinet;
    a pivoting handle configured to pivot from a stored position to an engaged position, the pivoting handle comprising:
        a cross member configured to permit a user to grip the pivoting handle;
        two extension members, each extension member coupled to a respective end of the cross member; and
        a cam arm coupled to one of the extension members at an end of the extension member that is opposite the cross member, the cam arm comprising:
            a spring arm configured to engage with a locking pin coupled to the cabinet;
            a clearance hole configured to permit the cam arm to clear the locking pin when the pivoting handle is in the stared position;
            an aperture configured to permit a pivot pin to secure the cam arm to the cabinet, the cam arm configured to pivot about the pivot pin; and
            a compression gap adjacent to the spring arm, the compression gap configured to permit the spring arm to provide resistance to the pivoting handle during pivoting;
    wherein:
        the pivoting handle is coupled to a top portion of the back side of the cabinet;
        the pivoting handle is configured to lay flat against the back side of the cabinet when in the stored position; and
        the pivoting handle is configured to pivot upwards towards the top portion of the back side of the cabinet when the pivoting handle is pivoted into the engaged position.

9. The portable dehumidifier of claim 8, further comprising a pivot plate coupled to the cabinet, the pivot plate comprising:
    the locking pin; and
    a second aperture configured to permit the pivot, pin to secure the cam arm to the cabinet via the pivot plate.

10. The portable dehumidifier of claim 8, further comprising a latch configured to secure the pivoting handle in the stored position, the latch coupled to a bottom portion of the back side of the cabinet.

11. The portable dehumidifier of claim 8, wherein, the spring arm comprises an indentation located on one end of the spring arm, the indentation configured to engage with the locking pin and secure the pivoting handle in the engaged position.

12. The portable dehumidifier of claim 8, wherein the locking pin comprises a bearing coupled to the locking pin, the bearing configured to rotate about the locking pin.

13. The portable dehumidifier of claim 12, wherein the spring arm comprises a straight edge that is configured to slide along the bearing of the locking pin while the pivoting handle is being pivoted.

14. The portable dehumidifier of claim 8, wherein the pivot pin comprises a shoulder bolt.

15. A portable dehumidifier, comprising:
   a cabinet comprising a front side and a back side opposite the front side; and
   a pivoting handle configured to pivot from a stored position to an engaged position, the pivoting handle comprising:
      a cross member configured to permit a user to grip the pivoting handle;
      two extension members, each extension member coupled to a respective end of the cross member; and
      a cam arm coupled to one of the extension members at an end of the extension member that is opposite the cross member, the cam arm comprising:
         a spring arm configured to engage with a locking pin coupled to the cabinet;
         a clearance hole configured to permit the cam arm to clear the locking pin when the pivoting handle is in the stored position;
         an aperture configured to permit a pivot pin to secure the cam arm to the cabinet, the cam arm configured to pivot about the pivot pin; and
         a compression gap adjacent to the spring arm, the compression gap configured to permit the spring arm to provide resistance to the pivoting handle during pivoting.

16. The portable dehumidifier of claim 15, further comprising a pivot plate coupled to the cabinet, the pivot plate comprising:
   the locking pin; and
   a second aperture configured to permit the pivot pin to secure the cam arm to the cabinet via the pivot plate.

17. The portable dehumidifier of claim 15, further comprising a latch configured to secure the pivoting handle in the stored position, the latch coupled to a bottom portion of the back side of the cabinet.

18. The portable dehumidifier of claim 15, wherein the spring arm comprises an indentation located on one end of the spring arm, the indentation configured to engage with the locking pin and secure the pivoting handle in the engaged position.

19. The portable dehumidifier of claim 15, wherein the locking pin comprises a bearing coupled to the locking pin, the bearing configured to restate about the locking pin.

20. The portable dehumidifier of claim 19, wherein the spring arm comprises a straight edge that is configured to slide along the bearing of the locking pin while the pivoting handle is being pivoted.

* * * * *